United States Patent
Okada

(10) Patent No.: US 6,643,402 B1
(45) Date of Patent: Nov. 4, 2003

(54) IMAGE COMPRESSION DEVICE ALLOWING RAPID AND HIGHLY PRECISE ENCODING WHILE SUPPRESSING CODE AMOUNT OF IMAGE DATA AFTER COMPRESSION

(75) Inventor: Shigeyuki Okada, Ogaki (JP)

(73) Assignee: Sanyo Electric Co., LTD, Osaka (JP)

( * ) Notice: Subject to any disclaimer, the term of this patent is extended or adjusted under 35 U.S.C. 154(b) by 0 days.

(21) Appl. No.: 09/532,816

(22) Filed: Mar. 21, 2000

(30) Foreign Application Priority Data

Mar. 23, 1999 (JP) .......................................... 11-078206
Aug. 3, 1999 (JP) .......................................... 11-219957

(51) Int. Cl.[7] .............................. G06K 9/36; G06K 9/46; H04B 1/66
(52) U.S. Cl. ....................... 382/232; 382/246; 382/233; 382/250; 382/251; 375/240.03; 375/240.2
(58) Field of Search ................................ 382/232, 233, 382/234, 236, 238, 239, 246, 250, 251, 248; 375/240, 240.01, 240.03, 240.04, 240.12, 240.13, 240.16, 240.22, 240.23, 240.24, 240.25, 240.27; 348/393.1, 394.1, 395.1, 404.1, 402.1, 415.1, 416.1, 564, 588; 358/261.1, 261.2, 427, 432, 433

(56) References Cited

U.S. PATENT DOCUMENTS

| | | | | |
|---|---|---|---|---|
| 5,822,463 A | * | 10/1998 | Yokose et al. | 382/251 |
| 5,963,673 A | * | 10/1999 | Kodama et al. | 382/239 |
| 5,990,976 A | * | 11/1999 | Higashida | 348/588 |
| 6,141,381 A | * | 10/2000 | Sugiyama | 375/240.16 |
| 6,343,157 B1 | * | 1/2002 | Yada | 382/246 |
| 6,363,114 B1 | * | 3/2002 | Kato | 375/240.04 |

FOREIGN PATENT DOCUMENTS

| | | |
|---|---|---|
| JP | 05191651 A | 7/1993 |
| JP | 08009373 A | 1/1996 |
| JP | 09261636 A | 10/1997 |
| JP | 09284767 A | 10/1997 |
| JP | 10136360 A | 5/1998 |
| JP | 11-078206 | 10/2002 |
| JP | 11-219957 | 10/2002 |

* cited by examiner

Primary Examiner—Andrew W. Johns
Assistant Examiner—Amir Alavi
(74) Attorney, Agent, or Firm—Armstrong, Westerman & Hattori, LLP

(57) ABSTRACT

The data transfer is repeatedly performed through a path constituted of an image holding RAM→a Huffman decoding circuit→an inverse quantization circuit→a quantization circuit→a Huffman encoding circuit until a code amount of compression image data generated by the Huffman encoding circuit becomes equal to or smaller than a maximum value determined according to an image quality, and thus a quantization threshold value and a Huffman code are determined. Every time the process is repeated, the quantization threshold value stored in a table of a first RAM and a Huffman code stored in a table of a second RAM corresponding to the quantization circuit and the Huffman encoding circuit, respectively, are newly set to a slightly higher value. As a quantization threshold value to be set in a table of a third RAM corresponding to the inverse quantization circuit, a quantization threshold value set in the first RAM at the previous quantization is used. As a Huffman code to be set in a table of a fourth RAM corresponding to the Huffman decoding circuit, a Huffman code set in the second RAM at a previous variable length encoding is used.

20 Claims, 11 Drawing Sheets

IMAGE COMPRESSION DEVICE ALLOWING RAPID AND HIGHLY PRECISE ENCODING WHILE SUPPRESSING CODE AMOUNT OF IMAGE DATA AFTER COMPRESSION

BACKGROUND OF THE INVENTION

1. Field of the Invention

The present invention relates generally to image compression devices compressing image data and more particularly to MPEG (Moving Picture Expert Group) video encoders or JPEG (Joint Photographic Coding Expert Group) encoders.

2. Description of the Background Art

Recently, demand for electronic still cameras is rapidly increasing replacing cameras employing the conventional photography technique which has been utilized since the 19$^{th}$ century. In electronic still cameras, "JPEG" system is employed as data compression/decompression technique to be used at the transmission and storage of image data in order to compress the image data and reduce the data amount for efficient processing. The JPEG system is made a standard by JPEG Commission (ISO/IEC 10918-1) under the ISO (International Organization for Standardization)/IEC (International Electrotechnical Commission).

JPEG system is also called JPEG algorithm whose technical core is discrete cosine transformation (hereinafter also referred to as DCT). JPEG system is widely utilized for image data processing in systems other than electronic still cameras, such as CD-ROM (Compact Disc-Read Only Memory) systems.

As JPEG system allows the compression/decompression of video data, some of the electronic still cameras employing JPEG system have a video shooting function. These technique for carrying out compression/decompression of video data according to JPEG system is called M-JPEG (Motion-JPEG).

Now, the amount of information treated in multimedia is enormous and its content is diverse. To make the multimedia fit for practical use, high-speed processing of the information is required. For the high-speed information processing data compression/decompression technique is necessary. "CMPEG" system is one of such data compression/decompression techniques. The MPEG system is made a standard by MPEG Commission under ISO/IEC (SO/IECJTC1/SC29/WG11).

MPEG system is constituted of three parts. Part 1 is "MPEG system part" (ISO/IEC IS 11172 Part1:Systems) defining the multiplex structure and synchronization system of video data and audio data. Part 2, "MPEG video part" (ISO/IEC IS 11172 Part2:Video) defines the high-efficiency coding method and the format of video data. In Part 3, "MPEG audio part" (ISO/IEC IS 11172 Part3:Audio), the high-efficiency coding method and the format of audio data are defined.

The core of a technique employed in MPEG video part is Motion Compensated Prediction (MC) and DCT. An encoding technique employing MC and DCT in combination is called a hybrid encoding technique. In other words, one can say that MPEG system is a technique combining JPEG system with MC.

MPEG system is applicable for transmission media in general including various storage media such as video CD (Compact Disc), CD-ROM, DVD (Digital Video Disc), video tape, memory card using non-volatile semiconductor memory and so on, various communication media such as LAN (Local Area Network), and various broadcasting media (ground-based broadcasting, satellite broadcasting, CATV (Community Antenna Television)).

FIG. 11 is a block circuit diagram of a conventional electronic still camera 101 employing JPEG system.

Electronic still camera 101 includes a JPEG core circuit 102, an imaging device 103, a signal processing circuit 104, a frame buffer 105, a display 106, a display circuit 107, a memory card 108, an input/output circuit 109, data buses 110 and 111 and a control core circuit 136.

JPEG core circuit 102 includes a DCT circuit 121, a quantization circuit 122, a Huffman encoding circuit 123, a code amount counter 124, a Huffman decoding circuit 131, an inverse quantization circuit 132, an inverse DCT (IDCT) circuit 133, and RAMs (Random Access Memories) 134 and 135.

Control core circuit 136 controls each of circuits 102–111 of electronic still camera 101.

Imaging device 103, constituted of a CCD or the like, picks up an image of an object and generates an output signal. Signal processing circuit 104 generates image data per screen from the output signal from imaging device 103. Image data per screen generated by signal processing circuit 104 is transferred to one of frame buffer 105 and display circuit 107 via data bus 110.

Display circuit 107 generates an image signal from the image data per screen transferred via data bus 110. Display 106 displays the image signal generated by display circuit 107 as an object image.

Frame buffer 105, constituted of a writable semiconductor memory (SDRAM (Synchronous Dynamic Random Access Memory), for example), a DRAM (Dynamic Random Access Memory), a Rambus DRAM or the like and writes and stores the image data per screen (frame) transferred via data bus 110. The stored image data is read out per screen from frame buffer 105. The image data per screen read out from frame buffer 105 is transferred to DCT circuit 121 of JPEG core circuit 102 via data bus 110.

In JPEG core circuit 102, the image data of one screen is divided into a plurality of macroblocks defined according to the standard of JPEG system, and the compression/decompression process is carried out for each block.

Here, DCT circuit 121, quantization circuit 122 and Huffman encoding circuit 123 constitute a JPEG encoder and carry out the compression process of the image data. On the other hand, Huffman decoding circuit 131, inverse quantization circuit 132 and inverse DCT circuit 133 constitute a JPEG decoder and carry out the decompression process of the image data.

With regards to the image data corresponding to one screen read out from frame buffer 105, DCT circuit 121 takes in the image data of one screen in unit of a block, carries out a two dimensional discrete cosine transformation on the image data corresponding to one block to generate a DCT coefficient.

Quantization circuit 122 quantizes the DCT coefficient supplied from DCT circuit 121 referring to a quantization threshold value stored in a quantization table stored in RAM 134.

Huffman encoding circuit 123 carries out variable length encoding of the DCT coefficient quantized by quantization circuit 122 referring to a Huffman code stored in a Huffman table stored in RAM 135 to generate compressed image data (hereinafter referred to as a compression image data) for every screen.

Code amount counter 124 counts the code amount of the compression image data each corresponding to one screen generated by Huffman encoding circuit 123.

The compression image data generated by Huffman encoding circuit 123 is transmitted to at least one of memory card 108 and input/output circuit 109 via data bus 111. Memory card 108 is detachably mounted on electronic still camera 101 and a flash memory 108a is installed in memory card 108.

Flash memory 108a writes and stores the image data each corresponding to one screen transferred via data bus 111. On the other hand, flash memory 108a reads and transfers stored compression image data per screen to data bus 111.

Input/output circuit 109 supplies the compression image data per screen transferred via data bus 111 to an external device (such as an external display, a personal computer, a printer or the like) connected to electronic still camera 101 as an output, and transfers to data bus 111 compression image data supplied as an input from the external device.

The compression image data read out from memory card 108 or the compression image data supplied as an input via input/output circuit 109 are transferred to Huffman decoding circuit 131 of JPEG core circuit 102 via data bus 111.

Huffman decoding circuit 131 carries out variable length decoding of the compression image data per screen transferred via data bus 111, referring to the Huffman code stored in the Huffman table stored in RAM 135 to generate decompressed image data (hereinafter referred to as an decompression image data) per screen.

Inverse quantization circuit 132 inverse quantizes the decompression image data each corresponding to one screen generated by Huffman decoding circuit 131, referring to the quantization threshold value stored in the quantization table store in RAM 134 to generate a DCT coefficient.

Inverse DCT circuit 133 carries out a two dimensional discrete cosine inverse transformation on the DCT coefficient generated by inverse quantization circuit 132.

The decompression image data each corresponding to one screen after the discrete cosine inverse transformation at inverse DCT circuit 133 is transferred to frame buffer 105 via data bus 110. Then, frame buffer 105 writes and stores the image data each corresponding to one screen transferred from inverse DCT circuit 133 via data bus 110. Display circuit 107 generates an image signal from the image data each corresponding to one screen transferred from inverse DCT circuit 133 via data bus 110 and, the image signal is displayed on display 106 ask an object image.

Here, the quantization threshold value stored in the quantization table stored in RAM 134 is a determinant of a compression ratio of compression image data and the quality of a reproduced image produced by decompressing the compression image data (displayed image on display 106, a reproduced image which is reproduced after being read out from memory card 108 by the external device and a reproduced image which is reproduced on the external device connected to input/output circuit 109). The Huffman code stored in the Huffman table stored in RAM 135 is a code of variable length which is allocated to quantized DCT coefficient or the decompression image data according to an expected frequency of occurrence and a Huffman code with a shorter code length is allocated to those with higher frequency of occurrence.

The maximum value of the code amount of the compression image data corresponding to one screen generated by Huffman encoding circuit 123 is determined according to an image quality mode previously set in electronic still camera 101. This is because the number of screens (the number of photographs) which can be stored in memory card 108 has been determined by the image quality mode of electronic still camera 101. For example, the number of photographs which can be stored in memory card 108 is determined to be a few sheets in a high image quality mode and several sheets in a low image quality mode.

In the high image quality mode, the compression ratio of the compression image data is set low. Hence, the code amount for the compression image data corresponding to one screen becomes large and the number of photographs which can be stored in memory card 108 decreases. On the other hand, in the low image quality mode, the compression ratio of the compression image data is set high, leading to a small code amount for the compression image data per screen, and hence to a large number of photographs which can be stored in memory card 108.

Thus, the quantization threshold value and the Huffman code must be optimized to limit the code amount of the compression image data per screen generated by Huffman encoding circuit 123 such that the code amount is equal to or smaller than the predetermined maximum value. Here, the data amount of the image data per screen read out from frame buffer 105 (that is, the image data per screen generated by signal processing circuit 104) is constant regardless of the object image taken by imaging device 103. Therefore, the compression ratio of the compression image data generated by Huffman encoding circuit 123 is uniquely calculated for the code amount of the compression image data. The larger the code amount, the lower the compression ratio. Therefore, to set the code amount of the compression image data equal to or smaller than the predetermined maximum value, the compression ratio of the compression image data is set equal to or higher than the predetermined minimum compression ratio.

The compression ratio (code amount) of ,the compression image data is significantly affected by the combination of the quantization threshold value, the Huffman code and the object image. Hence, even when the quantization threshold values and the Huffman codes are same, there will be an enormous difference in compression ratios of the compression image data if the object images to be taken are different.

For example, when the object image is a complex subtle image like an image of a mob, the compression ratio should be set high to suppress the code amount small. On the other hand, if the object image is a simple image like an image of a sky without a single cloud on a fine day, the compression ratio must be set low to make the code amount large. Hence, to find the compression ratio of the compression image data, the compression image data must be actually generated through the compression process by circuits 121–123 constituting the JPEG encoder. It is difficult to predict the compression ratio before performing such compression process.

Thus, in the conventional electronic still camera 101, first, the quantization threshold value and the Huffman; code are set to predetermined values. Then the compression process is performed by circuits 121–123 constituting the JPEG encoder to generate the compression image data. The code amount of the compression image data is counted by code amount counter 124. If the code amount of the compression image data is equal to or smaller than the predetermined maximum value, the set quantization threshold value and the Huffman code can be regarded as optimal and determined to be actually used as the quantization threshold value and the Huffman code.

Then, the compression image data generated based on thus-determined quantization threshold value and the Huffman code are transferred to memory card 108 or input/output circuit 109 via data bus 111.

If the code amount of the compression image data is larger than the predetermined maximum value, however, the, quantization threshold value and the Huffman code are set again to values a bit higher than the predetermined value. Then the compression image data is generated again through the compression process by circuits 121–123 and the code amount of the compression image data is counted by code amount counter 124. If the resulting code amount of the compression image data is equal to or smaller than the maximum value, the newly set quantization threshold value and the Huffman code can be regarded as optimal and determined to be the actually employed quantization threshold value and the Huffman code.

If the code amount of the compression image data is still larger than the maximum value, the quantization threshold value and the Huffman code are set again to a still higher value and the compression process is performed again.

Thus, in the conventional electronic still camera 101, the compression process is repeatedly performed by circuits 121–123 constituting the JPEG encoder to optimize the quantization threshold value and the Huffman code such that the code amount of the compression image data becomes equal to or smaller than the predetermined maximum value (that is, such that the compression ratio of the compression image data becomes equal to or higher than a predetermined minimum value). Hence, the determination of the quantization threshold value and the Huffman code takes some times.

The following problems exist in conventional electronic still camera 101.

i) The compression process is repeatedly performed by circuits 121–123 constituting the JPEG encoder for the optimization of the quantization threshold value and the Huffman code. Therefore, the necessary time from the image pick-up by imaging device 103 to the storage of the compression image data into memory card 108 (hereinafter referred to as a recording latency) is lengthened by the amount of time required for the compression process.

To avoid this problem, the recording latency can previously be set short. In this case, however, the number of repeated compression process by circuits 121–123 becomes small and the quantization threshold value and the Huffman code cannot be optimized. Thus the quality of the image reproduced by the decompression of the compression image data can be deteriorated.

ii) Whenever the compression process is performed by circuits 121–123 constituting the JPEG encoder, the image data of one screen must be read out from frame buffer 105 and the image data must be transferred to DCT circuit 121 via data bus 110. In other words, every time the compression process is performed by circuits 121–123, a read access to frame buffer 105 must be made via data bus 110. Hence, the access to frame buffer 105 becomes congested and the problem ii) in combination with the above-described problem i) further increases the recording latency.

In addition, when the access to frame buffer 105 becomes congested, the performance of the access to frame buffer 105 from signal processing circuit 104 and display circuit 107 comes to be degraded.

To avoid this problem, the bus width of data bus 110 and the acceptable bus width for frame buffer can be widened or the operation thereof can be speed up. Such frame buffer 105 is, however, expensive and consumes large current. Hence increase in the cost and the current consumption of electronic still camera 101 will be incurred. Particularly, as electronic still camera 101 is driven by the battery, the increase in current consumption poses a serious problem.

A camera employing a silver chloride photography technique allows successive photo-taking as the image is recorded on a film almost simultaneously with the image pick-up. On the other hand, a user cannot take photographs continuously with electronic still camera 101 due to the required recording latency as described above, which causes frustration on the user's side. To eliminate this inconvenience, the further reduction in recording latency has recently been sought.

The above-described problems i) and ii) may be occurred not just in the JPEG encoder but also in the MPEG encoder. As described above, MPEG system is the combination of JPEG system with MC. The MPEG encoder is formed by adding an MC circuit to the JPEG encoder (DCT circuit 121, quantization circuit 122 and Huffman encoding circuit 123). Therefore, the above-described problems i) and ii) apply to the MPEG encoder as well.

SUMMARY OF THE INVENTION

An object of the present invention is to provide an image compression device allowing a rapid and highly precise encoding of image data while setting a code amount of the encoded image data after compression to a predetermined value.

In brief, the present invention is an image compression device for compressing image data including a discreet cosine transformation circuit, a quantization circuit, a Huffman encoding circuit, a code amount counter and a control circuit.

The discreet cosine transformation circuit performs a two-dimensional discrete cosine transformation on image data constituting an image of one screen to generate a discrete cosine transformation coefficient.

The quantization circuit quantizes the discrete cosine transformation coefficient supplied from the discrete cosine transformation circuit referring to a quantization threshold value stored in a preset quantization table.

The Huffman encoding circuit performs a variable length encoding on the discrete cosine transformation coefficient quantized in the quantizaiton circuit referring to a Huffman code stored in a preset Huffman table to generate a compression image data.

The code amount counter counts a code amount of the compression image data generated by the Huffman encoding circuit.

The control circuit repeatedly performs a compression processing by the discrete cosine transformation circuit, the quantization circuit and the Huffman encoding circuit, while changing a setting of a parameter constituted of the quantizaiton threshold value and the Huffman code until the code amount of the compression image data counted by the code amount counter becomes equal to or smaller than a predetermined value, to determine an optimal version of the parameter for rendering the code amount of the compression image data equal to or smaller than the predetermined value.

The control circuit determines the optimal version of the parameter by dividing the image of the one screen into a plurality of blocks, selecting a block while changing the number of blocks to be selected from the plurality of blocks, and repeating the compression process on image data of the selected block.

According to another aspect, the present invention is an image compression device for compressing image data including an encoder and a control circuit.

The encoder compresses and encodes input image data.

The control circuit causes the encoder to process sample image data to determine an optimal version of a compression parameter for rendering a code amount of image data after the compression of an image of one screen to be compressed smaller than a predetermined value.

The control circuit divides the image of one screen to be compressed into a plurality of blocks, extracts a predetermined block from the plurality of blocks with a regularity so as to extract the block uniformly across the one screen, and generates the sample image data.

According to still another aspect, the present invention is an image compression device for compressing image data including a discreet cosine transformation circuit, a quantization circuit, a Huffman encoding circuit, a code amount counter, a Huffman decoding circuit, an inverse quantization circuit and a control circuit.

The discreet cosine transformation circuit performs a two-dimensional discrete cosine transformation on image data of one screen to generate a discrete cosine transformation coefficient.

The quantization circuit quantizes the discrete cosine transformation coefficient supplied from the discrete cosine transformation circuit referring to a quantization threshold value stored in a preset quantization table.

The Huffman encoding circuit performs a variable length encoding on the discrete cosine transformation coefficient quantized in the quantization circuit referring to a Huffman code stored in a preset Huffman table to generate a compression image data.

The code amount counter counts a code amount of the compression image data generated by the Huffman encoding circuit.

The Huffman decoding circuit performs a variable length encoding on the compression image data generated by the Huffman encoding circuit referring to the Huffman code stored in the preset Huffman table, to generate decompression image data.

The inverse quantization circuit performs an inverse quantization on the decompression image data generated by the Huffman decoding circuit referring to the quantization threshold value stored in the preset quantization table to generate a discrete cosine transformation coefficient and sends the generated discrete cosine transformation coefficient back to the quantization circuit. The quantization circuit quantizes the discrete cosine transformation coefficient sent back from the inverse quantization circuit referring to the quantization threshold value stored in the preset quantization table.

The control circuit repeatedly performs a compression processing by the quantization circuit, the Huffman encoding circuit, the Huffman decoding circuit and the inverse quantization circuit, while changing a setting of a parameter constituted of the quantizaiton threshold value and the Huffman code until the code amount of the compression image data counted by the code amount counter becomes equal to or smaller than a predetermined value, to determine an optimal version of the parameter for rendering the code amount of the compression image data equal to or smaller than the predetermined value.

According to still further aspect, the present invention is an image data compression device for compressing image data including a discreet cosine transformation circuit, a quantization circuit, a Huffman encoding circuit, a code amount counter, a Huffman decoding circuit, and a control circuit.

The discreet cosine transformation circuit performs a two-dimensional discrete cosine transformation on image data constituting an image of one screen to generate a discrete cosine transformation coefficient.

The quantization circuit quantizes the discrete cosine transformation coefficient supplied from the discrete cosine transformation circuit referring to a quantization threshold value stored in a preset quantization table.

The Huffman encoding circuit performs a variable length encoding on the discrete cosine transformation coefficient quantized in the quantization circuit referring to a Huffman code stored in a preset Huffman table to generate a compression image data.

The code amount counter counts a code amount of the compression image data generated by the Huffman encoding circuit.

The Huffman decoding circuit performs a variable length decoding on the compression image data generated by the Huffman encoding circuit referring to the Huffman code stored in the preset Huffman table, to generate decompression image data and sends the decompression image data back to the Huffman encoding circuit. The Huffman encoding circuit performs the variable length encoding on the decompression image data sent back from the Huffman decoding circuit referring to the Huffman code stored in the preset Huffman table.

The control circuit repeats a process by the Huffman encoding circuit and the Huffman decoding circuit while changing a setting of the Huffman code until a code amount of the compression image data counted by the code amount counter becomes equal to or smaller than a predetermined value, to determine an optimal version of the Huffman code for rendering the code amount of the compression image data equal to or smaller than the predetermined value.

Thus a main advantage of the present invention lies in that the rapid and highly precise encoding of the image data is allowed as the compression process is repeated for the image data of a selected block and the necessary time for the compression process can be reduced based on the optimization of the parameter compared with the case where the compression process is repeated for all image data for the image of one screen.

Another advantage of the present invention lies in that a predetermine block is selected while the number of blocks to be selected from blocks of each region is changed for each region, and the compression process is repeated for the image data of the selected block. Thus, the necessary time for the compression process can be reduced based on the optimization of the parameter compared with the case where the image for one screen is not divided into a plurality of regions, whereby the rapid and highly precise encoding of the image data is allowed.

Still another advantage of the present invention lies in that once the image data for a screen is transferred to the discrete cosine transformation circuit, the discrete cosine transformation circuit is not used at the time of determination of parameters. Hence, the necessary time for the transfer after the optimization of parameter can be reduced compared with the case where the image data of an image of one screen is transferred to the discrete cosine transformation circuit every time the process is repeated. Thus, the rapid and highly precise encoding of the image data is allowed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

The first embodiment of the present invention will be described with reference to the drawings hereinbelow.

Figure 11:
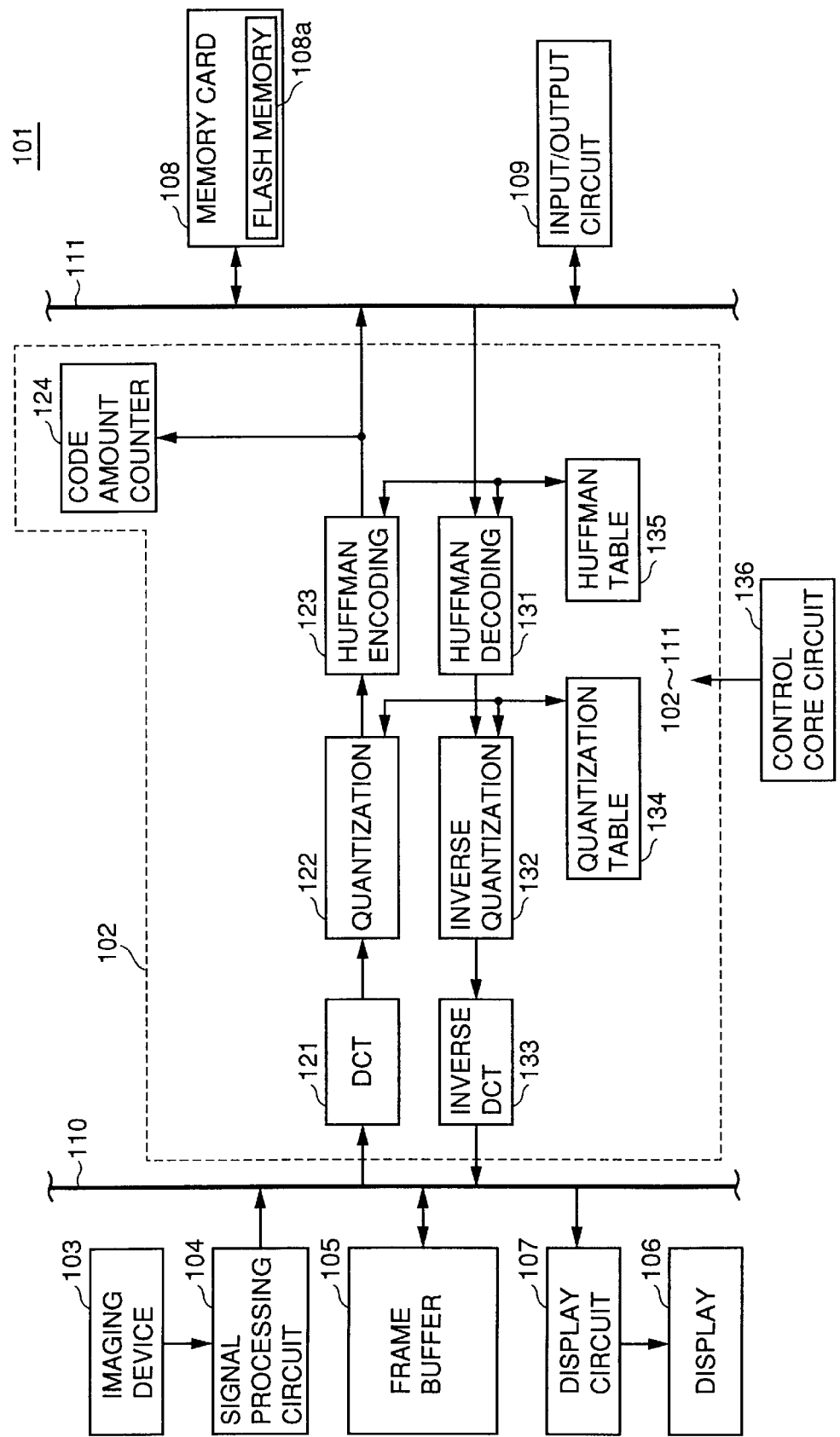
FIG. 11 is a schematic block diagram of a conventional electronic still camera.

In the first embodiment, the same component with that in the conventional example shown in FIG. 11 is denoted by the same reference character and the detailed description thereof will not be repeated.

Figure 1:
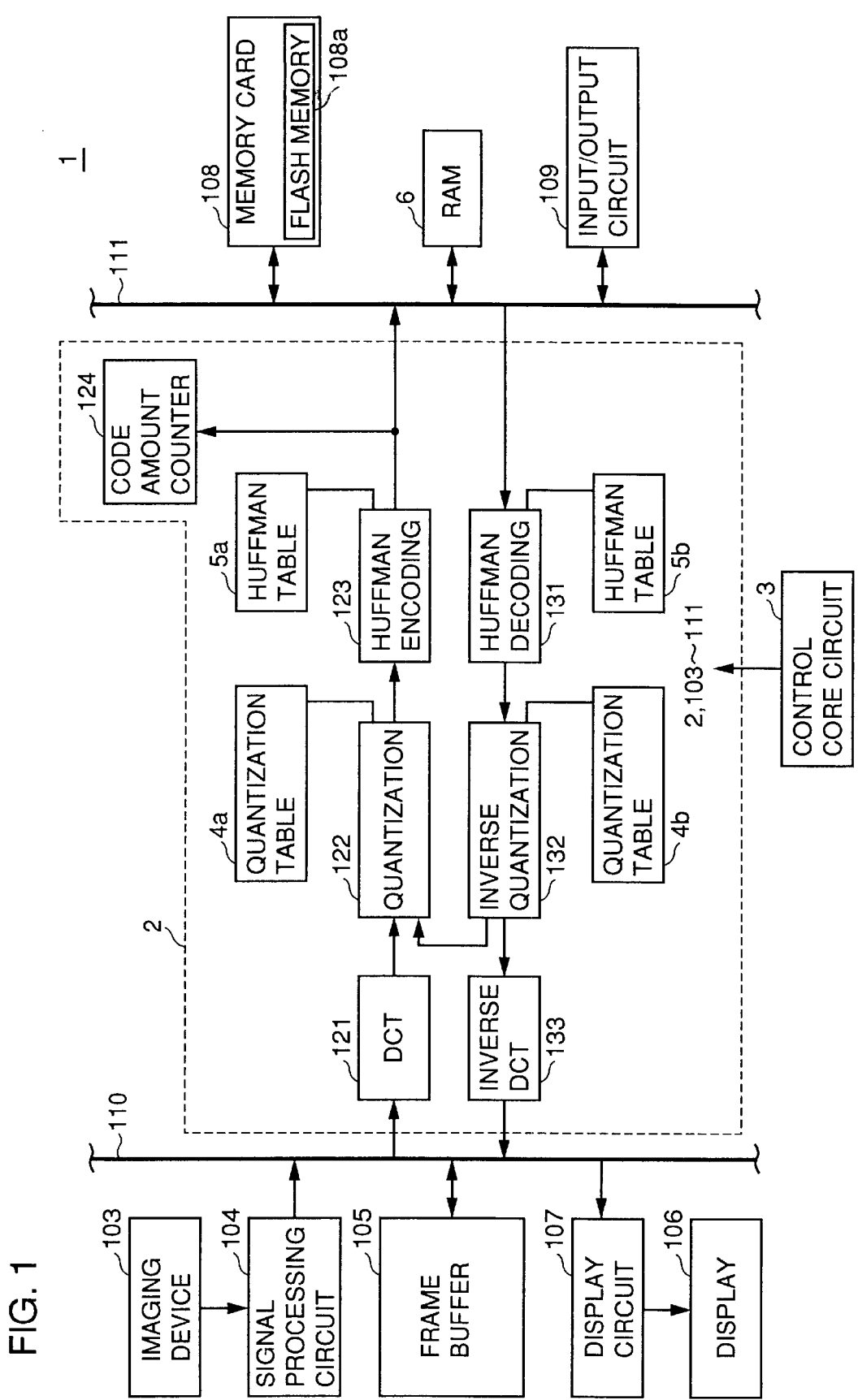
FIG. 1 is a schematic block diagram of an electronic still camera according to the first embodiment of the present invention.

FIG. 1 is a schematic block diagram of an electronic still camera 1 according to the first embodiment of the present invention employing JPEG system.

The structure of electronic still camera 1 is different from conventional still camera 101 shown in FIG. 11 in the following points.

(1) Electronic still camera 1 includes a JPEG core circuit 2 instead of JPEG core circuit 102 of electronic still camera 101.

(2) JPEG core circuit 2 includes RAMs 4a, 4b, 5a and 5b instead of RAM 134 holding the quantization table and RAM 135 holding the Huffman table in electronic still camera 101.

RAMs 4a and 4b store the quantization table storing the quantization threshold value. RAMs 5a and 5b store the Huffman table storing the Huffman code.

(3) Electronic still camera 1 includes a RAM 6. RAM 6 writes and stores the compression image data per one screen transferred via data bus 111. In addition, the compression image data per one screen is read out from RAM 6 and transferred to data bus 111.

(4) Electronic still camera 1 includes control core circuit 3 instead of control core circuit 136 of electronic still camera 101. Control core circuit 3 controls circuits 2, 103–111 of electronic still camera 1.

(5) In electronic still camera 1, the DCT coefficient generated by inverse quantization circuit 132 is supplied as an output to inverse DCT circuit and quantization circuit 122.

Next, an operation for determining the quantization threshold value and the Huffman code in electronic still camera 1 according to the first embodiment of the present invention will be described.

First, image data corresponding to one screen is read out from frame buffer 105. The image data corresponding to one screen is transferred in a path constituted of frame buffer 105→data bus 110→DCT circuit 121. Then, circuits 121–123 constituting the JPEG encoder perform the compression process to generate the compression image data. Code amount counter 124 counts the code amount of the generated compression image data.

Here, quantization circuit 122 carries out the quantization referring to the quantization threshold value store in the quantization table stored in RAM 4a. The quantization threshold value is set to as low value as possible (initial value) among the predetermined values. In this embodiment, the minimum value of the quantization threshold value is "all 1", the maximum value is "all 255". As the compression ratio of the compression image data is relatively low when the quantization threshold value is set to the minimum value, it is desirable to set the initial value of the quantization threshold value to a value slightly higher than the minimum value.

Huffman encoding circuit 123 performs variable length encoding referring to the Huffman code stored in the Huffman table stored in RAM 5a. The Huffman code is set to a predetermined initial value (as JPEG recommended table, for example).

If the code amount of the compression image data generated by Huffman encoding circuit 123 is equal to or smaller than the predetermined maximum value, the set quantization threshold value and the Huffman code can be regarded as optimal. Thus, the set values are determined to be the quantization threshold value and the Huffman code.

If the code amount of the compression image data generated by Huffman encoding circuit 123 is larger than the predetermined maximum value, the compression image data is transferred to RAM 6 via data bus 111 and stored therein and at the same time is transferred through a path constituted of Huffman decoding circuit 131→inverse quantization circuit 132 via data bus 111.

Then, a DCT coefficient generated by inverse quantization circuit 132 as a result of processing by Huffman decoding circuit 131 and inverse quantization circuit 132 are sent back to quantization circuit 122 and not to inverse DCT circuit 133.

At this time, Huffman decoding circuit 131 performs variable length encoding referring to the Huffman code stored in the Huffman table stored in RAM 5b. The Huffman code referred to at the variable length encoding by Huffman encoding circuit 123 (that is the initial value of quantization threshold value) is used as the Huffman code in this operation.

At the same time, when inverse quantization circuit 132 performs inverse quantization referring to the quantization threshold value stored in the quantization table stored in RAM 4b, the quantization threshold value referred to at the time of quantization by quantization circuit 122 (that is the initial value of quantization threshold value) is used as the quantization threshold value.

On the other hand, the quantization threshold value of RAM 4a and the Huffman code of RAM 5a are set to a value little bit higher than the initial value based on the control by control core circuit 3.

After the setting, quantization circuit 122 quantizes the DCT coefficient supplied as an input from inverse quantization circuit 132 referring to the quantization threshold value stored in the quantization table of RAM 4a. Huffman encoding circuit 123 performs variable length encoding on the DCT coefficient generated by the quantization at quantization circuit 122 referring to the Huffman code stored in the Huffman table of RAM 5a to generate the compression image data again.

If the resulting code amount of the compression image data generated by Huffman encoding circuit 123 is equal to or smaller than the maximum value, the quantization threshold value and the Huffman code which are newly set can be regarded as optimal. Thus, the newly set values are determined to be used as the quantization threshold value and the Huffman code.

If the code amount of the compression image data is still larger than the maximum value, the compression image data read out from RAM6 is transferred through a path constituted of Huffman decoding circuit 131 and inverse quantization circuit 132 via data bus 111. Then, the process is performed again by circuits 131 and 132 and the DCT coefficient generated by inverse quantization circuit 132 is sent back to quantization circuit 122.

Here, Huffman decoding circuit 131 performs variable length decoding referring to the Huffman code stored in the Huffman table stored in RAM 5b. At this time, the Huffman code which was referred to at the previous variable length encoding by Huffman encoding circuit 123 (that is, the Huffman code after the second setting modifying the value slightly higher than the former initial value) is used.

Inverse quantization circuit 132 performs inverse quantization referring to the quantization threshold value stored in the quantization table stored in RAM4b. Here, the quantization threshold value referred to at the previous quantization by quantization circuit 122 (that is, the quantization threshold value newly set to a value slightly higher than the initial value) is used.

The path of data transfer for determination of the quantization threshold value and the Huffman code according to the first embodiment of the present invention can be summarized as follows.

First path: frame buffer 105→data bus 110→DCT circuit 121→quantization circuit 122→Huffman encoding circuit 123→data bus 111→RAM 6 and Huffman decoding circuit 131.

Second path: following the first path, Huffman decoding circuit 131→inverse quantization circuit 132→quantization circuit 122→Huffman encoding circuit 123.

Third path: RAM6→Huffman decoding circuit 131→inverse quantization circuit 132→quantization circuit 122→Huffman encoding circuit 123.

Fourth and the subsequent paths: same as the third path.

In other words, the same path as the third path is repeatedly taken until the code amount of the compression image data becomes equal to or smaller than the predetermined maximum value, and the quantization threshold value and the Huffman code are determined.

Every time the same path as the third path is taken, the quantization threshold value of RAM 4a and the Huffman code of RAM 5a are set to values slightly higher than the former values. As to the quantization threshold value of RAM 4b, the quantization threshold value set in RAM 4a at quantization in the previous path is used. As to the Huffman code of RAM 5b, the Huffman code set in RAM 5a at the variable length encoding in the previous path is used.

Once the quantization threshold value and the Huffman code are determined as described above, the image data for one screen is again read out from frame buffer 105 and the image data for a screen is transferred through the path of frame buffer 105→data bus 110→DCT circuit 121, and then the compression process is performed by circuits 121–123 constituting the JPEG encoder to generate the compression image data. The generated compression image data is transferred to data bus 111.

As described above, with electronic still camera 1 according to the first embodiment of the present invention, the following effect and advantage can be obtained.

(1-1) The necessary time from the image pick-up by imaging device 103 to the storage of the compression image data to memory card 108 (recording latency) can be reduced.

In the path taken after the first path, the image data is not read out from frame buffer 105. The image data is read out from frame buffer 105 only in the first path and at the generation of the compression image data based on the determined quantization threshold value and the Huffman code. Thus the access to frame buffer 105 is reduced to only twice.

The time required for reading out the image data corresponding to one screen from frame buffer 105 is very long compared with the time required for the process in JPEG core circuit 2. Therefore, if the number of read accesses to frame buffer 105 is reduced to two, the recording latency can be reduced.

In addition, if the number of read accesses to frame buffer 105 can be reduced to two, the bus width of data bus 110 and frame buffer 105 need not to be widened and the congestion of accesses to frame buffer 105 can be avoided. Thus, the performance of the access to frame buffer 105 from signal processing circuit 104 and display circuit 107 can be improved.

(1-2) After reducing the recording latency, the number of repetitions of the compression process by quantization circuit 122 and Huffman encoding circuit 123 can be increased sufficiently. Then, the optimization of the quantization threshold value and the Huffman code is allowed and highly precise compression image data can be generated. Thus, the degradation of image quality of the image reproduced by decompressing the compression image data can be prevented.

The present invention is not limited to the first embodiment described above and can be modified as described below. Even in the modification thereof, the same or further effects and advantages can be obtained as the first embodiment.

First Modification of First Embodiment

In the structure of the first embodiment described above, the compression image data read out from RAM 6 is transferred to Huffman decoding circuit 131 in the third and subsequent paths. The purpose of which is to prevent the degradation of precision of the compression image data which can be caused by a combination of degradation in compression precision caused by the process in circuits 122 and 123 and the degradation of decompression precision caused by the process in circuits 131 and 132. If the compression image data generated by Huffman encoding circuit 123 is directly transferred to Huffman decoding circuit 131 in the third and following paths, the precision of the compression image data is gradually degraded as the third path is repeatedly taken. Thus the determined quantization threshold value and the Huffman code can become not optimal.

When the degradation of precision caused by the process in circuits 122, 123, 131 and 132 is not significant, the compression image data generated by Huffman encoding circuit 123 can be directly transferred to Huffman decoding circuit 131 in the third and following paths. In this case RAM 6 can be omitted.

Second Modification of First Embodiment

In the structure of the first embodiment described above, once the quantization threshold value and the Huffman code are determined, the image data is read again from frame buffer 105 and the compression image data is generated from this image data. The purpose of which is to avoid the degradation of precision of the compression image data due to the degradation in precision caused by the process in circuits 122, 123, 131 and 132 as described with respect to the modification of first embodiment described above.

When the degradation in precision caused by the process in circuits 122, 123, 131 and 132 is not significant, once the quantization threshold value and the Huffman code are determined, the compression image data generated by Huffman encoding circuit 123 at the last path can be transferred to data bus 111 as the complete compression image data without reading out the image data from frame buffer 105.

In this case, the image data is read out from frame buffer 105 only at the first path and the read access to frame buffer 105 is only once. Thus the effect of the first embodiment can be enhanced. In addition, as frame buffer 105 can be immediately rewritten as soon as the process through the first path has been completed, the invention can accommodate the application in M-JPEG or where successive phototaking is required without increase in capacity of frame buffer 105.

Alternatively, if the compression compliant with JPEG is sufficiently fast compared with the speed of frame buffer rewriting, a line memory with smaller capacity can be used in place of the frame buffer. Then, the product cost can be reduced.

Third Modification of First Embodiment

RAM 6 can be omitted by making flash memory 108a of memory card 108 perform the function of RAM 6.

The Fourth Modification of First Embodiment

JPEG core circuit 2 can be applied to an encoder of image data in devices other than the electronic still camera, such as CD-ROM system.

Fifth Modification of First Embodiment

JPEG core circuit 2 can be applied to the MPEG encoder as well as to the JPEG encoder. As described above, MPEG system is a combination of JPEG scheme with MC. MPEG encoder is formed by adding an MC circuit to the JPEG encoder (DCT circuit 121, quantization circuit 122 and Huffman encoding circuit 123).

Second Embodiment

Figure 2:
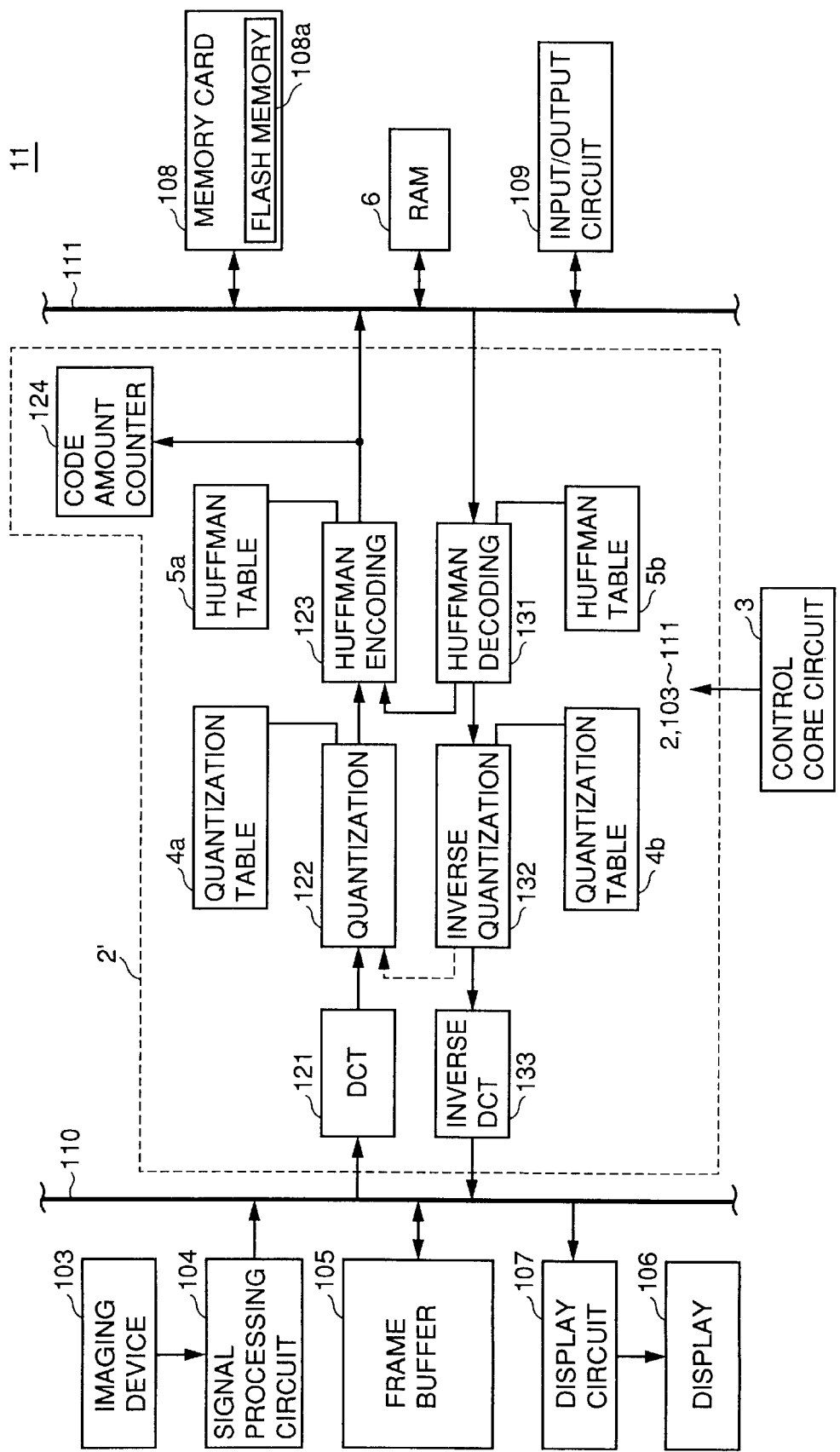
FIG. 2 is a schematic block diagram of an electronic still camera according to the second embodiment of the present invention.

FIG. 2 is a schematic block diagram referenced for describing a structure of the second embodiment of the present invention. Here, in the second embodiment, the same portion with the first embodiment will be denoted by the same reference character and the description thereof will not be repeated.

The difference between the structure of an electronic still camera 11 of the second embodiment and electronic still camera 1 of the first embodiment shown in FIG. 1 is that electronic still camera 11 includes a JPEG core circuit 2 as described below in place of JPEG core circuit 2.

(1) In electronic still camera 11, the DCT coefficient generated by inverse quantization circuit 132 is supplied as an output only to inverse DCT circuit 133.

(2) In electronic still camera 11, the decompression image data produced by Huffman decoding circuit 131 is supplied as an output not only to inverse quantization circuit 132 but also to Huffman coding circuit 123.

In summary, the data transfer path for determination of the quantization threshold value and the Huffman code in the second embodiment is as follows.

First path: same as the first embodiment (frame buffer 105→data bus 110→DTC circuit 121→quantization circuit 122→Huffman encoding circuit 123→data bus 111 RAM 6 and Huffman decoding circuit 131).

Second path: following the first path, Huffman decoding circuit 131→Huffman encoding circuit 123.

Third path: RAM 6→Huffman decoding circuit 131→Huffman encoding circuit 123.

Fourth and subsequent paths: same as the third path.

In brief, the difference between the operation of the first embodiment and the operation of the second embodiment is that the optimal Huffman code is determined not by supplying the DCT coefficient generated by inverse quantization circuit 132 as an output to quantization circuit 122, but by supplying decompression image data generated by Huffman decoding circuit 131 back to Huffman encoding circuit 123 in the second and the subsequent paths.

Thus, the same effects and advantages as in the first embodiment can be obtained in electronic still camera 11 of the second embodiment.

Alternatively, the first embodiment and the second embodiment can be employed together to multiply the effect. Specifically, the structure can be formed such that the processing result is supplied as an output from Huffman decoding circuit 131 to Huffman encoding circuit 123 up to a predetermined number of operations and after that the processing result is supplied as an output from inverse quantization circuit 132 to quantization circuit 122. Alternatively, the structure can be formed such that the processing result is supplied as an output from inverse quantization circuit 132 to quantization circuit 122 up to a predetermined number of operations and after that the processing result is supplied as an output from Huffman decoding circuit 131 to Huffman encoding circuit 123.

Third Embodiment

Figure 3:
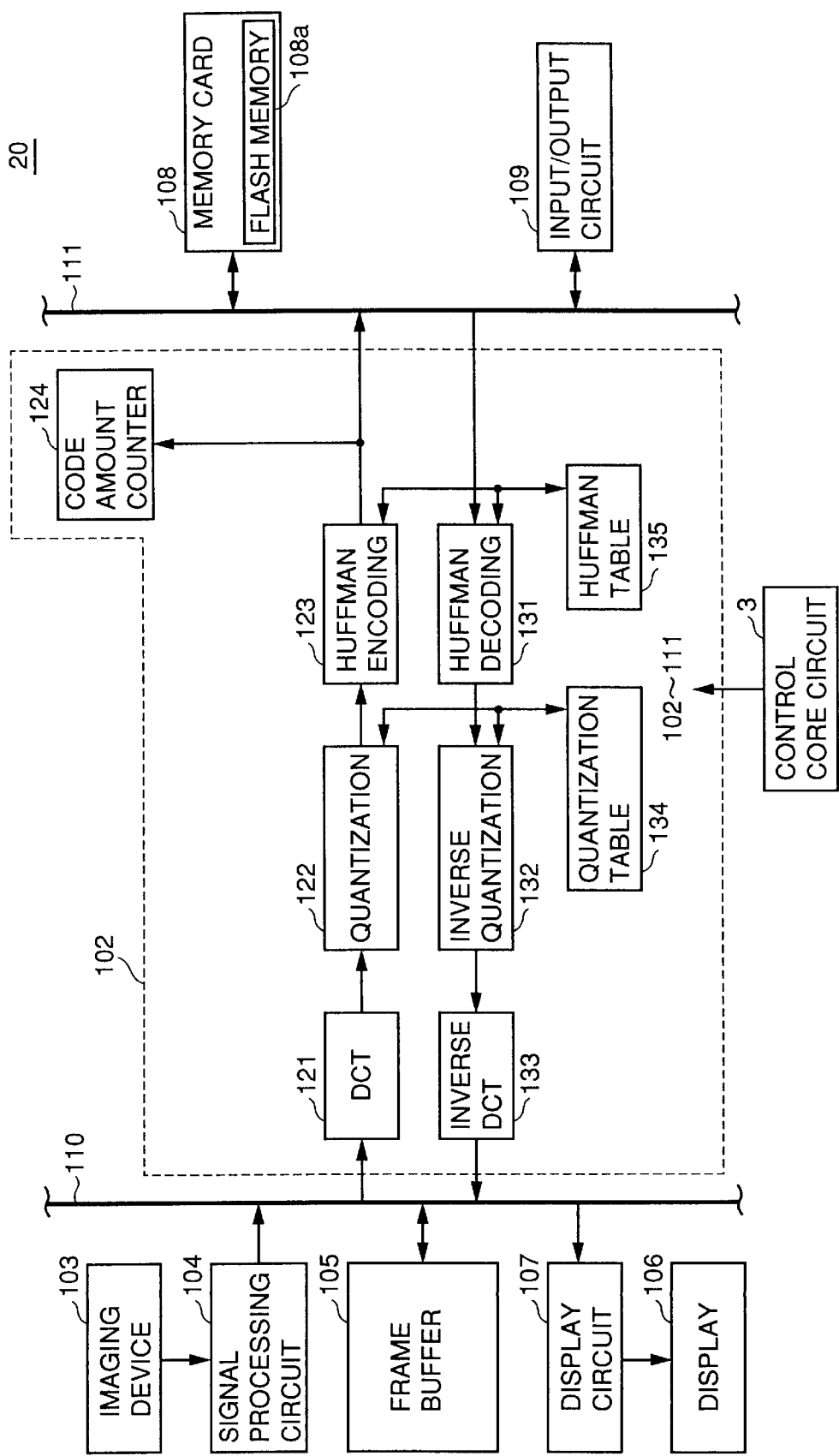
FIG. 3 is a schematic block diagram of an electronic still camera according to the third embodiment of the present invention.

FIG. 3 is a schematic block diagram referenced for describing a structure of an electronic still camera 20 according to the third embodiment of the present invention.

The difference between the structure of electronic still camera 20 of the third embodiment and conventional electronic still camera 101 shown in FIG. 11 lies in a control operation performed by a control core circuit 3 provided in place of control core circuit 136 as described below.

The image data transferred through the path constituted of frame buffer 105→data bus 110→DCT circuit 121 at the time of determination of the quantization threshold value and the Huffman code in conventional electronic still camera 101 is image data corresponding to one entire screen.

On the other hand, at the time of determination of the quantization threshold value and the Huffman code in electronic still camera 20 of the third embodiment, one screen of the image data read out from frame buffer 105 is divided into a plurality of blocks and image data in only a certain block among the plurality of blocks will be transferred via the path of frame buffer 105→data bus 110→DCT circuit 121.

Figure 4A:
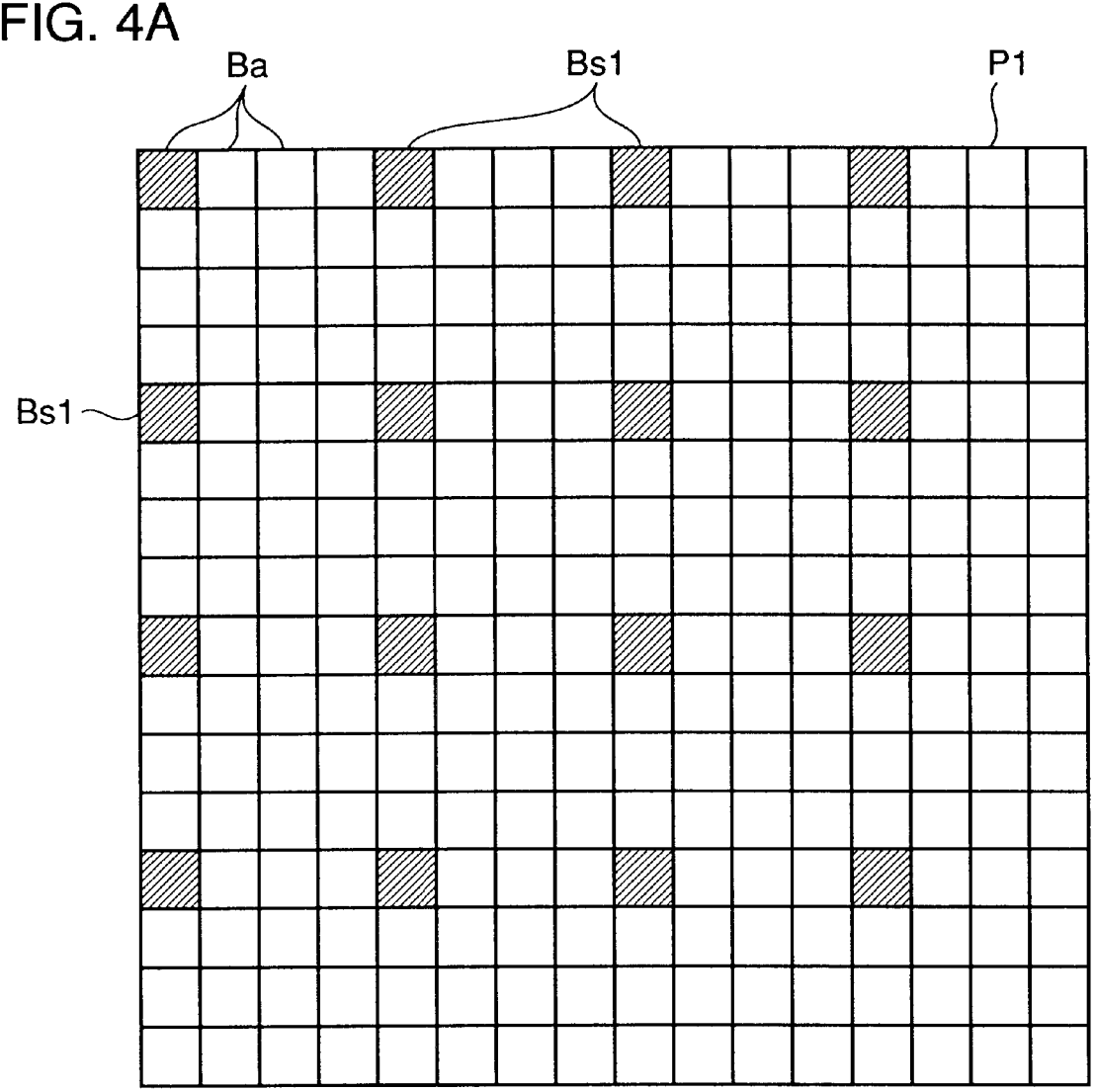
FIGS. 4A and 4B are schematic diagrams referenced for describing a screen P2 generated during the operation of the third embodiment.
Figure 4B:
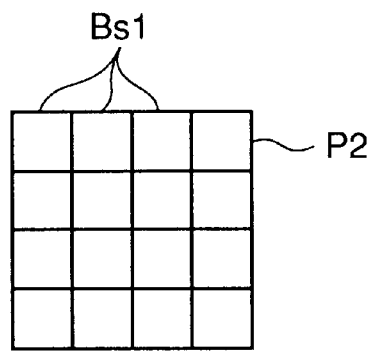

As shown in FIG. 4A, image data corresponding to one screen P1 read out from frame buffer 105 is divided into 256 blocks Ba's arranged in sixteen columns by sixteen rows (16×16). Here, block Ba is set based on a macroblock as a unit and each block Ba is constituted of m×n macroblocks. (Here, m is the number of blocks in length and n is the number of blocks in width and, m and n are natural numbers.) Next, starting from the block located at the upper most position in left end column in screen P1, every fourth block in every fourth row is selected (hereinafter these selected columns are denoted as "Bs1" to distinguish them from other blocks). Then a new screen P2 is formed with sixteen blocks Bs1's (4 rows×4 columns) as shown in FIG. 4B.

Then, only image data corresponding to screen P2 is read out from frame buffer 105 and transferred through the path constituted of frame buffer 105→data bus 110→DCT circuit 121. The quantization threshold value and the Huffman code are set to predetermined set values corresponding to screen P2, the compression process is performed by circuits 121–123 to generate the compression image data, and the code amount of the generated compression image data is counted by code amount counter 124. The compression process by circuits 121–123 is repeated until the code amount of the compression image data becomes equal to or smaller than the predetermined maximum value corresponding to screen P2, and the quantization threshold value and the Huffman code are temporarily determined based on the image data of screen P2.

Figure 5A:
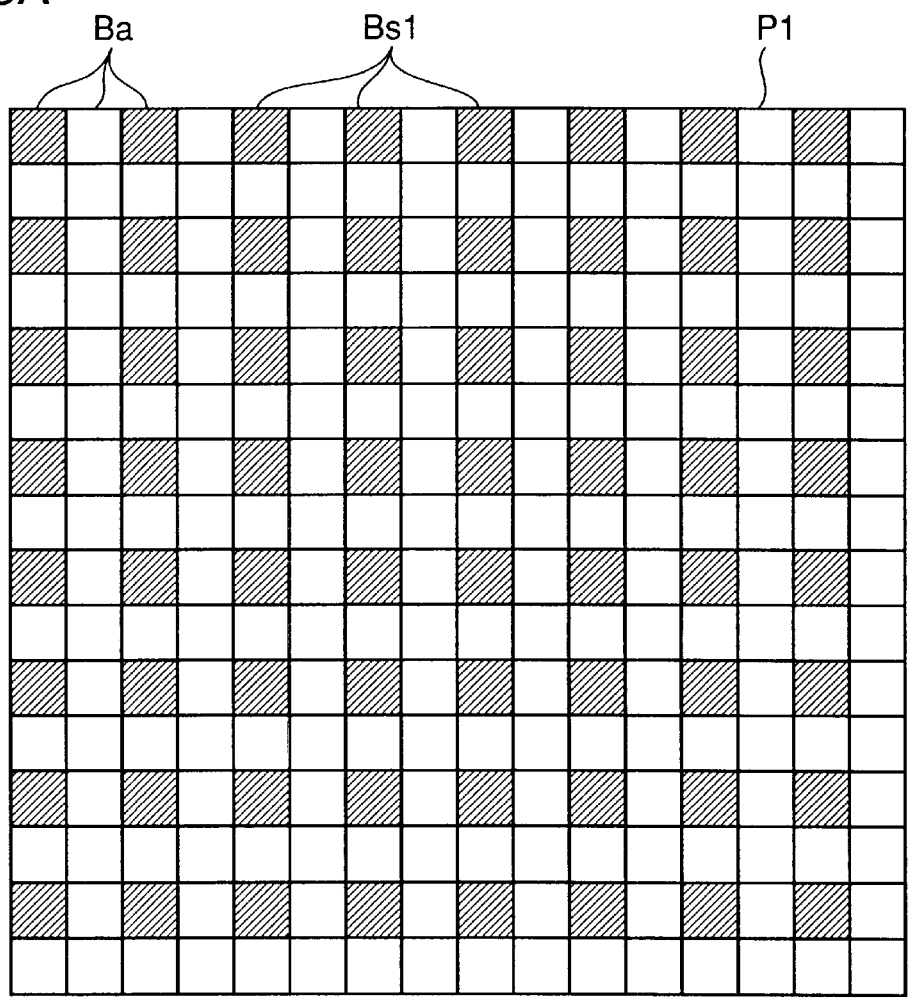
FIGS. 5A and 5B are schematic diagrams referenced for describing a screen P3 generated during the operation of the third embodiment.
Figure 5B:
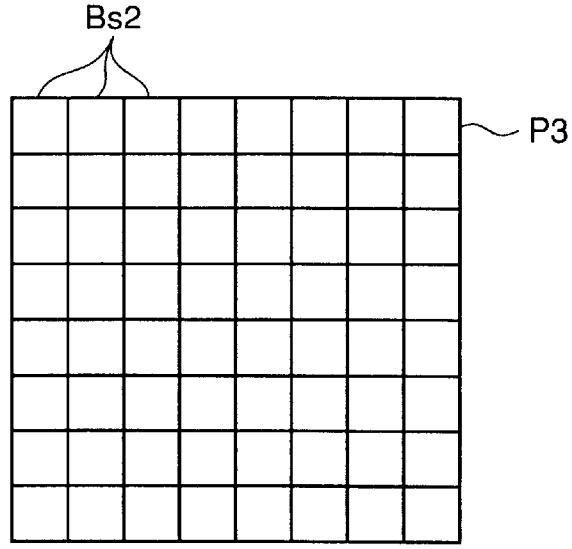

Next, starting from the block located at the upper most position in left end column in screen P1, every second block in every second row is selected (hereinafter denoted by the reference character "Bs2" to be distinguished from other blocks) from blocks Ba's in screen P1 as shown in FIG. 5A. Then a screen P3 constituted of 64 blocks Bs2's (eight rows×eight columns) is formed as shown in FIG. 5B.

Then, only image data corresponding to screen P3 is read out from frame buffer 105 and transferred via the path constituted of frame buffer 105→data bus 110→DCT circuit 121. With reference to the quantization threshold value and the Huffman code temporarily determined based on the image data of screen P2, compression data is generated through the compression processing by circuits 121–123 and the code amount of the compression data is counted by code amount counter 124. By the repetition of compression processing by circuits 121–123 until the code amount of the compression image data becomes equal to or smaller than the predetermined maximum value, the quantization threshold value and the Huffman code are temporarily determined based on the image data of screen P3.

Here, the relation represented by expression (1) is satisfied between the code amount of the image data of screen P1 and the code amount of the image data of screen P2.

$$SP1 = SP2 \times 16 + E1 \qquad (1)$$

where, SP1 is the code amount of the image data of screen P1,

SP2 is the code amount of the image data of screen P2,

E1 is compression error between image data of screens P1 and P2.

As screen P2 is formed with sixteen blocks Bs1's (=Bas) uniformly arranged on screen P1 including 256 blocks Ba's, the size of screen P2 is one sixteenth that of screen P1. As the information on the object image existing in the portion of screen P2 outside blocks Bs1's constituting screen P2 is not included in the image data corresponding to screen P2, the simple multiplication by the factor of sixteen of code amount SP2 of the image data of screen P2 does not yield the code amount SP1 of the image data of screen P1.

The value of code amount SP1 is, therefore, the value of a multiplication of code amount SP2 by the factor of sixteen plus compression error E1 attributable to the information of the object image existing in the portion of screen P1 outside the blocks Bs1's forming P2.

Figure 6A:
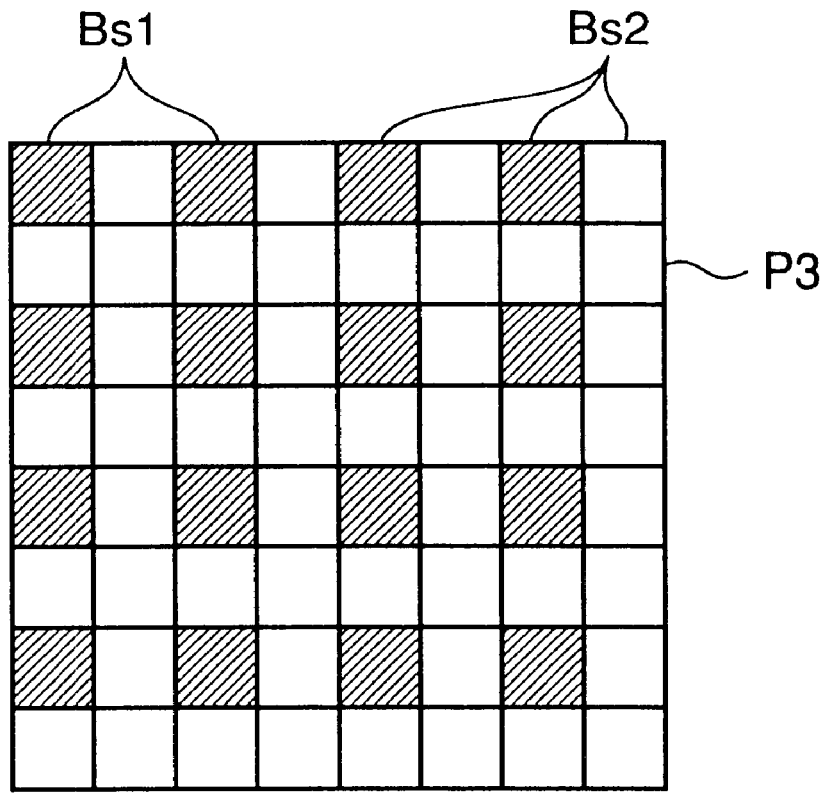
FIGS. 6A and 6B are schematic diagrams referenced for describing a relation between blocks Bs1 and Bs2 constituting screens P2 and P3, respectively.
Figure 6B:
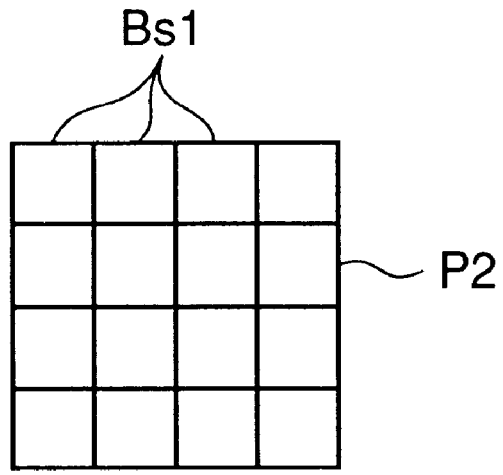

The relation between block Bs1 and Bs2 forming screens P2 and P3, respectively, is as shown in FIGS. 6A and 6B. If, starting from the block located at upper left of screen P3, every second block in every second row is selected from 64 blocks Bs2's in screen P3 as blocks Bs1's as shown in FIG. 6A, a screen formed by these sixteen blocks Bs1's will be screen P2 as shown in FIG. 6B.

Thus, the relation represented by the expression (2) holds between the code amounts of image data of screens P2 and P3.

$$SP3 = SP2 \times 4 + E2 \qquad (2)$$

where, SP3 is the code amount of the image data of screen P3, E2 is the compression error between image data of screens P2 and P3.

As screen P2 is formed with sixteen blocks Bs1's uniformly arranged on screen P3 including 64 blocks Bs2's, the size of screen P2 is one fourth the size of screen P3. As the information on the object image existing in the portion of screen P3 other than blocks Bs1's constituting screen P2 is not included in the image data corresponding to screen P2, the simple multiplication of code amount SP2 of the image data of screen P2 by the factor of four does not yield the code amount SP3 of the image data of screen P3.

The value of code amount SP3 is, therefore, the value of a multiplication of code amount SP2 by the factor of four plus compression error E2 attributable to the information on the object image existing in the portion of screen P3 outside the blocks Bs1's forming P2.

In the third embodiment, if the compression error E2 is in the range of allowable value, compression error E1 is also assumed to be in the range of allowable value. Then, the quantization threshold value and the Huffman code temporarily determined based on the image data of screen P2 are formally determined as the quantization threshold value and the Huffman code optimized for the image data of screen P1.

Then, all image data for screen P1 is read out from frame buffer 105 and transferred via the path of frame buffer 105→data bus 110→DCT circuit 121. With reference to the quantization threshold value and the Huffman code determined as described above, the compression process is performed by circuits 121–123 to generate the compression image data. The compression image data is transferred to memory card 108 or input/output circuit 109 via data bus 111.

Figure 7A:
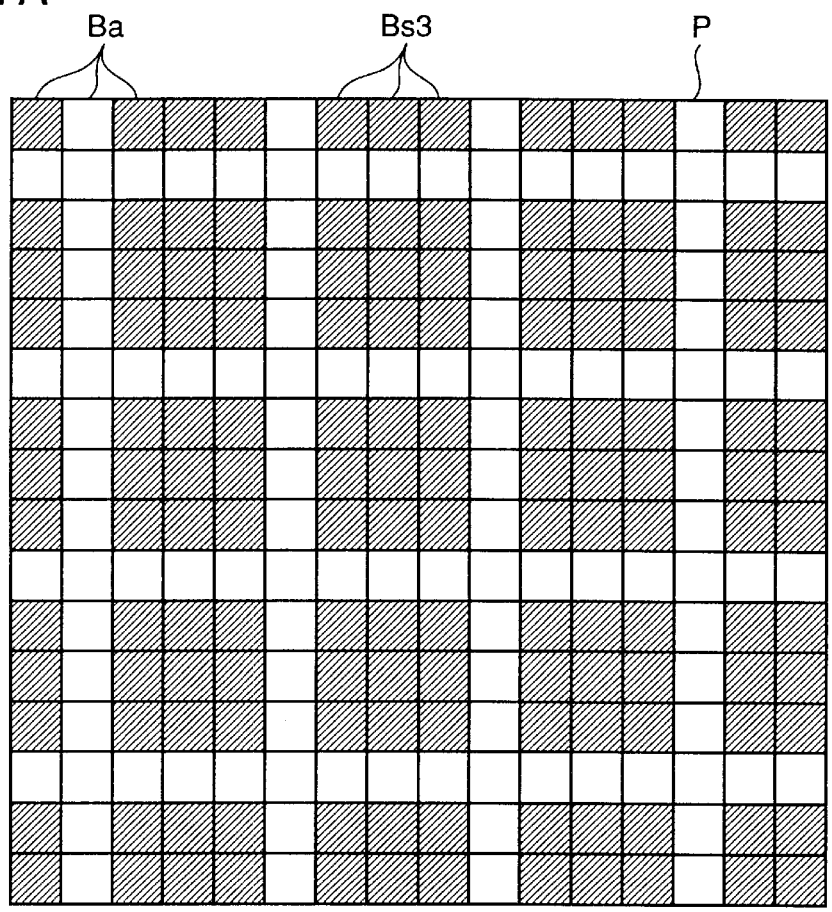
FIGS. 7A and 7B are schematic diagrams referenced for describing a screen P4 generated during the operation of the third embodiment.
Figure 7B:
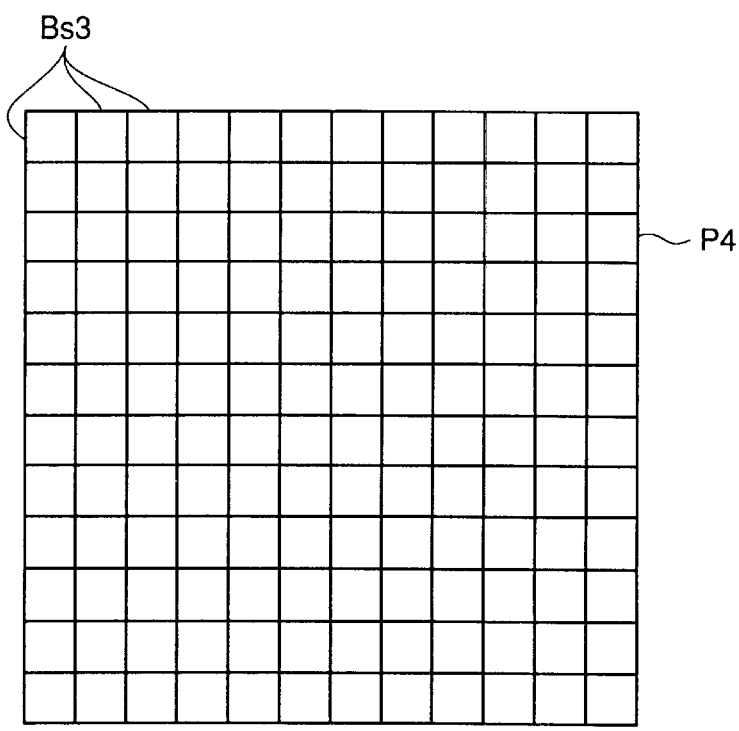

If compression error E2 is higher than the allowable value, blocks Ba's except those on the second and the (2+4n)th (n is a natural number) rows and columns starting from the upper left block are selected (hereinafter referred to as "Bs3" to distinguish from other blocks) as shown in FIG. 7A. As shown in FIG. 7B, a screen P4 is formed with 144 blocks Bs3's (12 rows×12 columns).

Then, only image data corresponding to screen P4 is read out from frame buffer 105 and transferred via the path constituted of frame buffer 105→data bus 110→DCT circuit 121. With reference to the quantization threshold value and the Huffman code temporarily determined based on the image data of screen P3, compression data is generated through the compression process by circuits 121–123 and the code amount of the compression data is counted by code amount counter 124. By repeatedly performing the compression process by circuits 121–123 until the code amount of the compression image data becomes equal to or smaller than the predetermined maximum value for screen P4, the quantization threshold value and the Huffman code are temporarily determined based on the image data of screen P4.

Figure 8A:
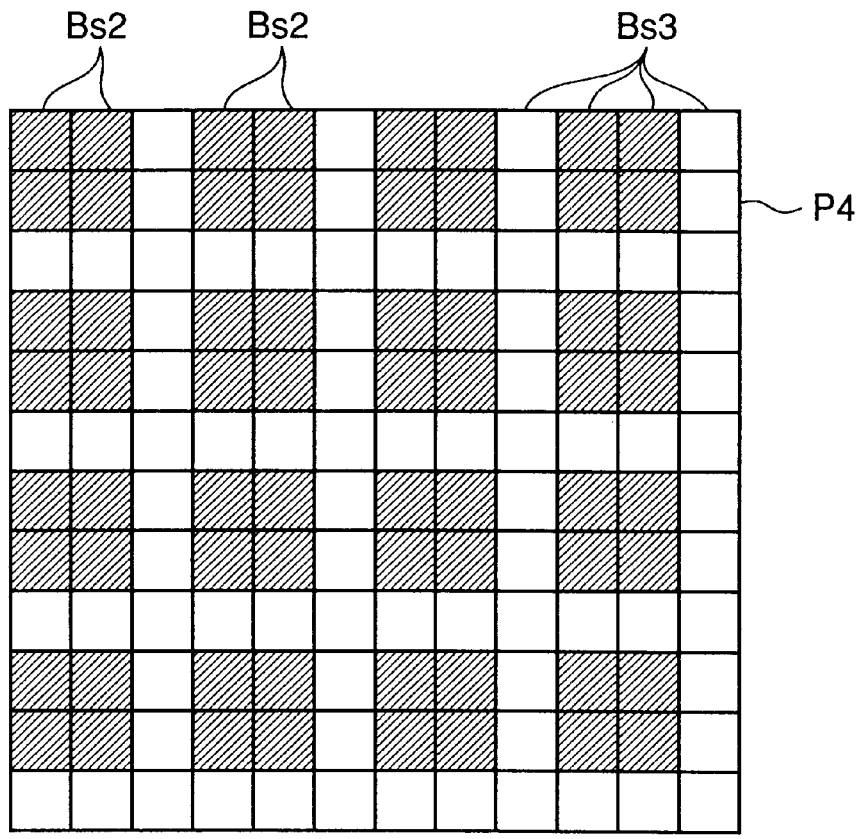
FIGS. 8A and 8B are schematic diagrams referenced for describing a relation between blocks Bs2 and Bs3 constituting screens P3 and P4, respectively.
Figure 8B:
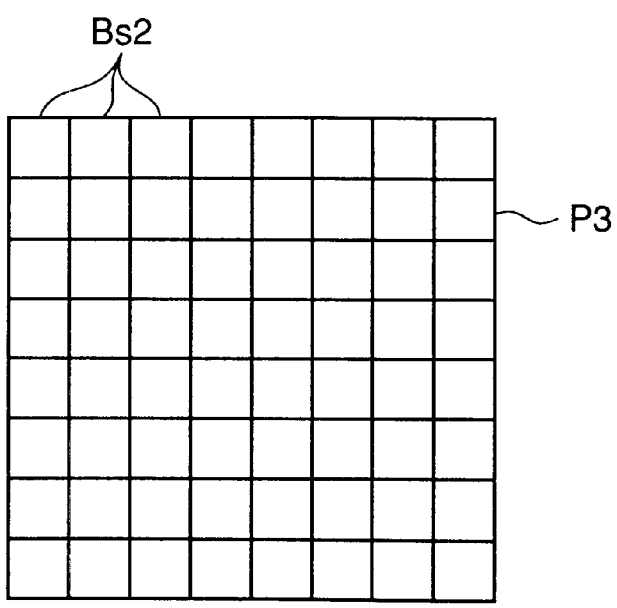

Here, the relation between blocks Bs2 and Bs3 constituting screens P3 and P4, respectively, is as shown in FIGS. 8A and 8B. Blocks except those in every third row and column starting from the uppermost block in the left end column are selected as blocks Bs2's from 144 blocks Bs3's of screen P4 as shown in FIG. 8A, and a screen formed by these 64 blocks Bs2's is screen P3 as shown in FIG. 8B.

Thus, the relation represented by the expression (3) holds between the code amounts of image data of screens P3 and P4.

$$SP4 = SP3 \times 144/64 + E3 \quad (3)$$

where, SP4 is the code amount of the image data of screen P3,

E3 is the compression error between image data of screens P3 and P4.

As screen P3 is formed with 64 blocks Bs2's uniformly arranged on screen P4 including 144 blocks Bs3's, the size of screen P3 is 64/144 the size of screen P4. As the information on the object image existing in the portion of screen P4 outside blocks Bs2's constituting screen P3 is not included in the image data corresponding to screen P3, the simple multiplication of code amount SP3 of the image data of screen P3 by the factor of 144/64 does not yield the code amount SP4 of the image data of screen P4. The value of code amount SP4 is, therefore, the value of a multiplication of code amount SP3 by the factor of 144/64 plus compression error E3 attributable to the information of the object image existing in the portion of screen P4 outside the blocks Bs2's forming P3.

In the structure of the third embodiment, if the compression error E3 is in the range of allowable value, compression error E1 is also regarded as being in the range of allowable value. Then, the quantization threshold value and the Huffman code temporarily determined based on the image data of screen P3 are formally determined as the quantization threshold value and the Huffman code optimized for the image data of screen P1.

Then, all image data for screen P1 is read out from frame buffer 105 and transferred via the path of frame buffer 105→data bus 110→DCT circuit 121. With reference to the quantization threshold value and the Huffman code formally determined as described above, the compression process is performed by circuits 121→123 to generate the compression image data. The compression image data is transferred to memory card 108 or input/output circuit 109 via data bus 111.

If compression error E3 is higher than the allowable value, the quantization threshold value and the Huffman code are determined based on the entire image data of screen P1 as in conventional electronic still camera 101 and the compression image data is generated with thus determined quantization threshold value and the Huffman code and transferred to data bus 111.

Figure 9:
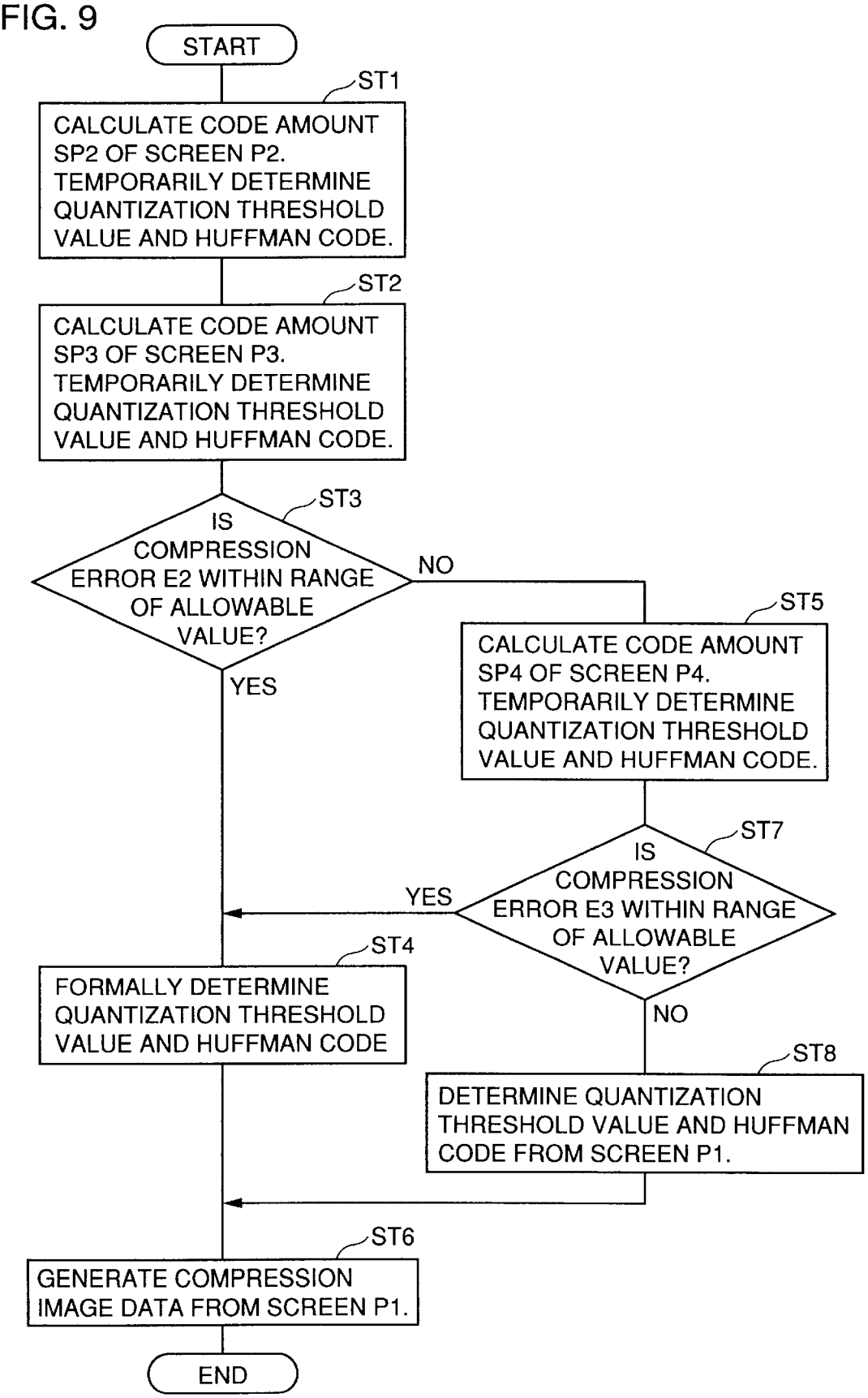
FIG. 9 is a flow chart referenced for describing an operation of the third embodiment.

FIG. 9 is a flow chart referenced for describing the operation of the third embodiment.

First at step ST1, with respect to the image data of screen P1, the compression image data is generated with reference to the quantization threshold value and the Huffman code set for screen P2. Then, code amount SP2 is found and the quantization threshold value and the Huffman code are temporarily determined based on the image data of screen P2.

Next at step ST2, with respect to the image data of screen P3, the compression image data is generated with reference to the quantization threshold value and the Huffman code temporarily determined based on the image data of screen P2. Then, code amount SP3 is found and the quantization threshold value and the Huffman code are temporarily determined based on the image data of screen P3.

Then at step ST3, compression error E2 is calculated from code amounts SP2 and SP3. If compression error E2 is within the range of allowable value (YES in step ST3), the process proceeds to step ST4 whereas if compression error E2 is higher than the allowable value (NO in step ST3), the process proceeds to step ST5.

When the process proceeds to step ST4 from step ST3, the quantization threshold value and the Huffman code temporarily determined based on the image data of screen P2 is formally determined to be the quantization threshold value and the Huffman code optimized for the image data of screen P1 and, after the determination, the process proceeds to step ST6.

At step ST6, the compression image data of the image data of screen P1 is generated based on the quantization threshold value and the Huffman code formally determined at step ST4 and transferred to data bus 111. Thus the encoding process is completed.

At step ST5, the compression image data for the image data of screen P4 is generated with reference to the quantization threshold value and the Huffman code temporarily determined based on the image data of screen P3. Then, code amount SP4 of the compression image data is found and the quantization threshold value and the Huffman code are temporarily determined based on the image data of screen P4.

Then at step ST7, compression error E3 is calculated from code amounts SP3 and SP4. If compression error E3 is within the allowable value (YES in step ST7), the process proceeds to step ST4, whereas if compression error E3 is higher than the allowable value (NO in step ST7), the process goes to step ST8.

When the process proceeds from step ST7 to step ST4, the quantization threshold value and the Huffman code temporarily determined based on the image data of screen P3 are formally determined as the quantization threshold value and the Huffman code optimized for the image data of screen P1 at step ST4.

At step ST8, with respect to the image data of screen P1, the quantization threshold value and the Huffman code are determined based on entire image data of screen P1 as in conventional electronic still camera 101, and after the determination, the process proceeds to step ST6.

At step ST6, the compression image data of the image data of screen P1 is generated based on the quantization threshold value and the Huffman code determined at step ST8 and transferred to data bus 111. Thus the encoding process is completed.

The above-described process from step ST1 to step ST8 is performed through the control of circuits 102–111 by control core circuit 3. In other words, control core circuit 3 performs an operation for determining a parameter constituted of a quantization threshold value and a Huffman code which are optimal to set the code amount, of the compression image data equal to or smaller than a predetermined maximum value, by dividing the image of screen P1 to a plurality of blocks Ba's, selecting a predetermined blocks Ba's from blocks Ba's while changing the number of blocks to be selected, and repeating the compression process of the image data of selected blocks Ba's.

In other words, control core circuit 3 is provided with RISC-CPU function, for example, and the above-described operation of control core circuit 3 is performed by RISC-CPU through a software. Control core circuit 3 of first and second embodiments also has RISC-CPU function similarly to control core circuit 3 of the third embodiment.

As described above, the following effects and advantages can be obtained in the third embodiment.

(3-1) The recording latency can be shortened.

In the steps ST1, ST2 and ST5, the image data of screens P2, P3 and P4 are read out from frame buffer 105, respectively, and transferred to DCT circuit 121 via data bus 110. The sizes of screens P2, P3 and P4 are smaller than the screen size of screen P1. The data amount of the image data is proportional to the size of the screen. Hence, if the image data amount of screen P1 is represented as 1, the image data amount of screen P2 is 1/16, the image data amount of screen P3 is 1/4, and the image data amount of screen P4 is 144/256.

The time required for the compression processing by circuits 121–123 is proportional to the data amount of the image data. Thus, the process time in each of steps ST1, ST2 and ST5 is shorter than the process time in step ST8. With regards to normal object images, the process is usually performed in the order of step ST1→step ST2→step ST3→step ST4→step ST6 and the process rarely proceeds to step ST5 and most unlikely to step ST8. Thus, in the structure of the third embodiment, the time required for the final determination of the quantization threshold value and the Huffman code is shorter than in conventional electronic still camera 101.

In addition to the reduction in recording latency, the number of repetitions of the compression process by circuits 121–123 can be made sufficiently large through the process from step ST1 to ST8. Thus, the optimization of the quantization threshold value and the Huffman code is allowed, leading to the generation of highly precise compression image data, whereby the degradation in the quality of an image reproduced through the decompression of the compression image data can be prevented.

(3-2) As the image data amounts of screens P2, P3 and P4 are smaller than the image data amount of screen P1, the time required for reading access to frame buffer 105 in any of steps ST1, ST2 or ST5 is shorter than the time required for the reading access to frame buffer 105 in step ST8. Thus the access time to frame buffer 105 is reduced and the congestion of access to frame buffer 105 can be prevented without widening the bus width of frame buffer 105 and data bus 110.

Thus, as the result of the effect of (3-2) together with the effect of (3-1), the recording latency can be further reduced. In addition, performance of access from signal processing circuit 104 and display circuit 107 to frame buffer 105 can be improved.

(3-3) As the screens P2, P3 and P4 are formed by extracting blocks Bs1's (corresponding to group of blocks Bs3's in, screen P4) uniformly arranged in screen P1, the characteristic of the screen can be extracted on the average. Regardless of the information on the object image, compression errors E1, E2 and E3 can be suppressed to a small amount, and the highly precise encoding can be achieved.

The present invention is not limited to the structure of the third embodiment described above and can be modified as described below. In the modification, the same or more favorable effects and advantages than those in the third embodiment can be obtained.

First Modification of Third Embodiment

When the process proceeds from step ST3 to ST4, at step ST4, the quantization threshold value and the Huffman code temporarily determined based on the image data of screen P3 but not of screen P2 are formally determined to be the quantization threshold value and the Huffman code optimized for the image data of screen P1.

When the process proceeds from step ST7 to ST4, at step ST4, the quantization threshold value and the Huffman code temporarily determined based on the image data of screen P4 but not of screen P3 are formally determined to be the quantization threshold value and the Huffman code optimized for the image data of screen P1.

Second Modification of Third Embodiment

In the third embodiment described above, screen P1 is divided into 256 blocks Ba's (16×16). Alternatively screen P1 can be divided into r×s blocks Ba's (r is the number of blocks in length and s is the number of blocks in width, and r and s are natural numbers). In this case again, block Ba must be set based on the macroblock as a unit.

Third Modification of Third Embodiment

In the structure of the third embodiment, screen P2 is formed with sixteen blocks Ba's (4×4) and screen P3 is formed with 64 blocks Ba's (8×8) and screen P4 is formed with 144 blocks Ba's (12×12). Alternatively, the number of blocks Ba's forming each of screens P2 to P4 can be set to another number.

For example, screen P2 can be formed with (8×8) blocks Ba's, screen P3 can be formed with (12×12) blocks Ba's and screen P4 can be omitted. In this case, the process performed in steps ST5 and ST7 are also eliminated and if NO in step ST3, the process proceeds to step ST8.

Still alternatively, it is possible to form screen P2 with (2×2) blocks Ba's, screen P3 with (4×4) blocks Ba's, screen P4 with (8×8) blocks Ba's, and add a screen P5 formed with 144 (=12×12) blocks Ba's. In this case, if compression error E3 is higher than the allowable value in step ST7, code amount SP5 of the image data of screen P5 is found and the quantization threshold value and the Huffman code are temporarily determined based on the image data of screen P5. Then, compression error E4 between the image data of screens P4 and P5 is calculated. If compression error E4 is within the range of allowable value, the process proceeds to step ST4 and if compression error exceeds the allowable value, the process proceeds to step ST8.

In addition, the numbers of blocks Ba's forming each of screens P2–P4 in length and in width may be different from each other, and it is possible to form screen P2 with (6×4) blocks Ba's, screen P3 with (8×10) blocks Ba's, screen P4 with (14×12) blocks Ba's.

Fourth Modification of Third Embodiment

Figure 10:
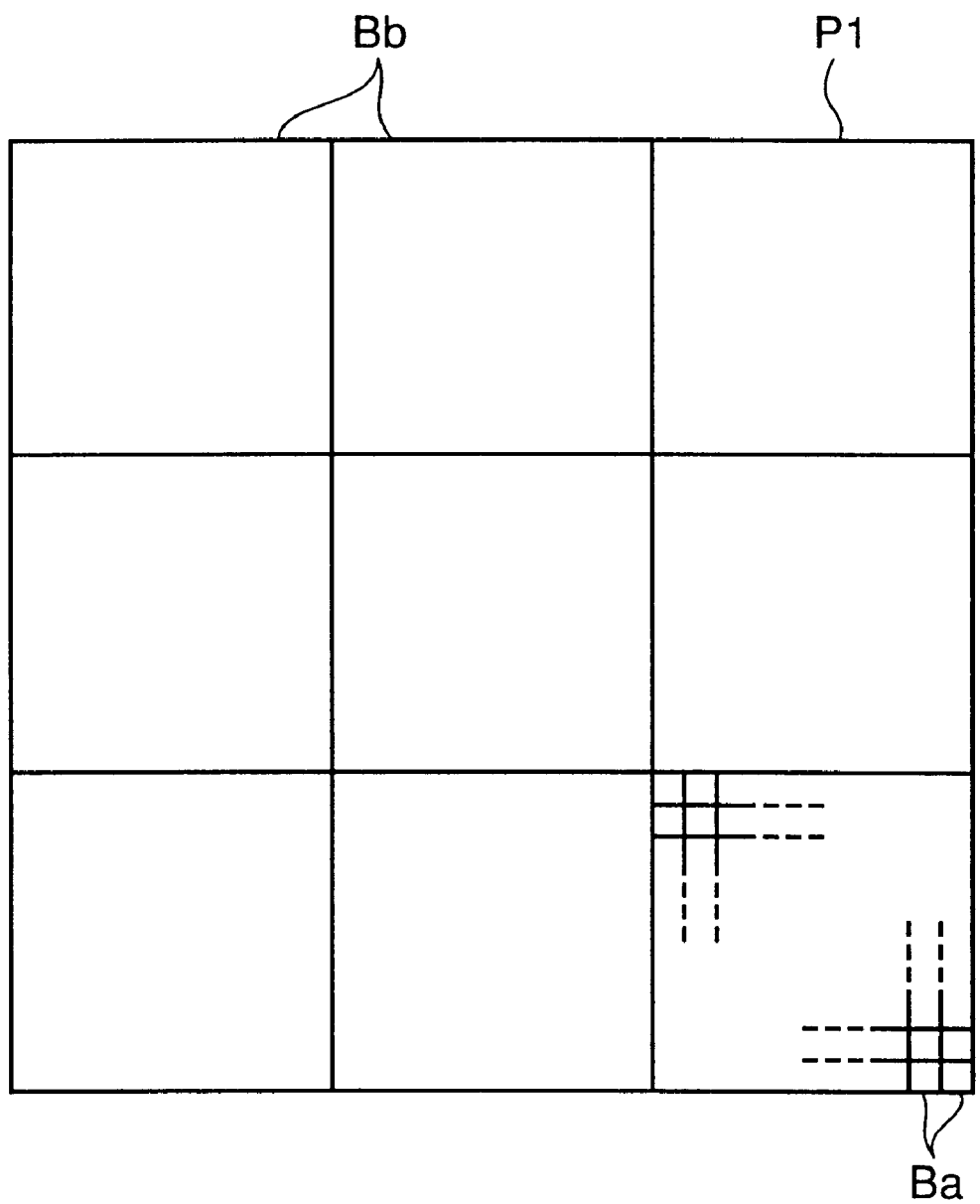
FIG. 10 is a schematic diagram referenced for describing an operation of a modification of the third embodiment.

As shown in FIG. 10, screen P1 is divided into nine regions Bb's arranged three blocks in length and three blocks in width (3×3) and each region Bb is further divided into 256 blocks Ba's arranged sixteen in length and sixteen in width (16×16). Then, through the same process as steps ST1–ST5, step ST7 and step ST8, as in the structure of the third embodiment, the quantization threshold value and the Huffman code are determined for each region Bb.

In this case, only with respect to region Bb where compression error E2 exceeds the allowable value, step ST5 is performed, whereas only with respect to region Bb where compression error E3 exceeds the allowable value, step ST8 is performed. Hence, when the number of regions Bb's where compression error E2 is equal to or lower than the allowable value is large or when the number of regions Bb where compression error E3 is equal to or lower than the allowable value is large, the time required for the final determination of the quantization threshold value and the Huffman code becomes shorter than a case where screen P1 is not divided into regions Bb's like the third embodiment described above, and the effect of the third embodiment is further enhanced.

Alternatively, screen P1 can be divided not only into nine (=3×3) regions Bb's, but also to p×q regions Bb's (p is the number of regions in length and q is the number of regions in width, and p and q are natural numbers.)

Fifth Modification of Third Embodiment

JPEG core circuit 102 and control core circuit 3 can be applied not only to the electronic still camera but also to encoders of image data such as CD-ROM.

Sixth Modification of Third Embodiment

The structure of JPEG core circuit 102 and control core circuit 3 can be applied not only to the JPEG encoder but also to the MPEG encoder. As described above, MPEG system is a technique combining JPEG system with MC. The MPEG encoder is formed by adding an MC circuit to a JPEG encoder (DCT circuit 121, quantization circuit 122, Huffman encoding circuit 123).

Seventh Modification of Third Embodiment

The structure of third embodiment can be employed in combination with the structure of first or second embodiment. All of the structures of first to third embodiments can be employed in combination. In this case, the effect will be multiplied.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image compression device for compressing image data comprising:
    a discrete cosine transformation circuit performing a two-dimensional discrete cosine transformation on, image data constituting an image of one screen to generate a discrete cosine transformation coefficient;
    a quantization circuit quantizing the discrete cosine transformation coefficient supplied from said discrete cosine transformation circuit referring to a quantization threshold value stored in a preset quantization table;
    a Huffman encoding circuit performing a variable length encoding on the discrete cosine transformation coefficient quantized in said quantization circuit, referring to a Huffman code stored in a preset Huffman table to generate compression image data;
    a code amount counter counting a code amount of the compression image data generated by said Huffman encoding circuit; and
    a control circuit repeatedly performing a compression process by said discrete cosine transformation circuit, said quantization circuit and said Huffman encoding circuit, while changing a setting of a parameter constituted of said quantizaiton threshold value and said Huffman code until the code amount of the compression image data counted by said code amount counter becomes equal to or smaller than a predetermined value, to determine an optimal version of said parameter for rendering the code amount of the compression image data equal to or smaller than the predetermined value;
        wherein said control circuit dividing said image of one screen into a plurality of blocks, selecting a block from said plurality of blocks while changing the number of blocks to be selected, and repeating said compression process on image data of the selected block to determine said optimal version of said parameter.

2. The image compression device according to claim 1, wherein said control circuit
    i) with respect to image data of a group of first blocks constituted from a selection of predetermined blocks from said blocks, repeats said compression process, to generate a first compression image data and to find an optimal version of said parameter for the image data of the group of first blocks,
    ii) with respect to image data of a group of second blocks constituted from a selection of blocks, the number of which is larger than the number of said first blocks, repeats said compression process to generate a second compression image data and to find an optimal version of said parameter for the image data of the group of second blocks,
    iii) calculates a compression error between the first compression image data and the second compression image data from code amounts of the first compression image data and the second compression image data based on the numbers of blocks included in the group of first blocks and the group of second blocks, and if said compression error is within an allowable value, regards that a compression error between the compression image data generated from the image data of said image of one screen and the first compression image data is within the allowable value, and determines as said optimal version of said parameter the optimal version of said parameter for the image data of one of the group of first blocks and the group of second blocks.

3. The image compression device according to claim 1 wherein said control circuit divides said image of one screen into a plurality of regions, divides each of said regions into said plurality of blocks, selects a predetermined block while changing for each region the number of blocks to be selected from blocks of each region, and repeats said compression process for image data of the selected block to determine an optimal version of said parameter for each region.

4. The image compression device according to claim 1 wherein said control circuit
i) divides said image of one screen to be compressed into a plurality of blocks, extracts a predetermined block from said plurality of blocks with such regularity that blocks are extracted uniformly across the screen, and generate sample image data, and
ii) makes said discrete cosine transformation circuit, said quantization circuit and said Huffman encoding circuit process said sample image data, and determine the optimal version of said parameter for rendering the code amount of the image data of the image of one screen to be compressed after the compression equal to or smaller than said predetermined value.

5. An image compression device for compressing image data comprising:
an encoder compressing and encoding input image data; and
a control circuit causing said encoder to process sample image data to determine an optimal version of a compression parameter for rendering a code amount of image data after the compression of an image of one screen to be compressed equal to or smaller than a predetermined value;
wherein said control circuit divides said image of one screen to be compressed into a plurality of blocks, extracts a predetermined block from said plurality of blocks with a regularity so as to extract the block uniformly across the one screen, and generates said sample image data.

6. The image compression device according to claim 5 further comprising:
a code amount counter counting a code amount of compression image data generated by said encoder.

7. The image compression device according to claim 5 wherein
said control circuit extracts the predetermined block from said plurality of blocks at predetermined intervals to generate said sample image data.

8. The image compression device according to claim 5 wherein
said control circuit extracts groups of blocks arranged adjacent to each other from said plurality of blocks at predetermined intervals to generate said sample image data.

9. The image compression device according to claim 5 wherein
said control circuit
with respect to sample image data of a group of first blocks constituted from an extraction of predetermined blocks from said plurality of blocks, performs said compression process, to generate a first compression image data and to find an optimal version of said compression parameter for the sample image data of said group of first blocks,
with respect to sample image data of a group of second blocks constituted from a regular extraction of blocks, the number of which is larger than the number of said first blocks, performs said compression process to generate a second compression image data and to find an optimal version of said compression parameter for the sample image data of the group of second blocks, iii) calculates a compression error between the first compression image data and the second compression image data from code amounts of the first compression image data and the second compression image data based on the numbers of blocks included in the group of first blocks and the group of second blocks, and if said compression error is within an allowable value, regards that a compression error between the compression image data generated from the image data of said image of one screen and the first compression image data is within the allowable value, and determines as said optimal version of said compression parameter the optimal version of said compression parameter for the image data of one of the group of first blocks and the group of second blocks.

10. The image compression device according to claim 5 wherein
said encoder includes;
a discrete cosine transformation circuit performing the discrete cosine transformation on the image data constituting the image of one screen to generate the discrete cosine transformation coefficient,
a quantization circuit quantizing the discrete cosine transformation coefficient supplied from said discrete cosine transformation circuit referring to the quantization threshold value stored in the preset quantization table, and
a Huffman encoding circuit performing the variable length encoding on the discrete cosine transformation coefficient quantized by said quantization circuit referring to the Huffman code stored in the preset Huffman table, to generate the compression image data.

11. The image compression device according to claim 10 wherein
said compression parameter includes at least one of said quantization threshold value and said Huffman code.

12. An image compression device for compressing image data comprising:
a discret cosine transformation circuit performing a two-dimensional discrete cosine transformation on image data constituting an image of one screen to generate a discrete cosine transformation coefficient;
a quantization circuit quantizing the discrete cosine transformation coefficient supplied from said discrete cosine transformation circuit referring to a quantization threshold value stored in a preset quantization table;
a Huffman encoding circuit performing a variable length encoding on the discrete cosine transformation coefficient quantized in said quantization circuit, referring to a Huffman code stored in a preset Huffman table to generate compression image data;
a code amount counter counting a code amount of the compression image data generated by said Huffman encoding circuit; and
a Huffman decoding circuit performing a variable length encoding on the compression image data generated by said Huffman encoding circuit referring to a Huffman code stored in a preset Huffman table, to generate decompression image data;
an inverse quantization circuit performing an inverse quantization on the decompression image data generated by said Huffman decoding circuit referring to a quantization threshold value stored in a preset quantization table to generated a discrete cosine transformation coefficient and sending the generated discrete cosine transformation coefficient back to said quantization circuit; said quantization circuit quantizing the discrete cosine transformation coefficient sent back from said inverse quantization circuit referring to the quantization threshold value stored in the preset quantization table; and a control circuit repeatedly performing a compression process by said quantization circuit and said Huffman encoding circuit, said Huffman decoding circuit and said inverse quantization circuit, while changing a setting of a parameter constituted of said quantization threshold value and said Huffman code until the code amount of the compression image data counted by said code amount counter becomes equal to or smaller than a predetermined value, to determine an optimal version of said parameter for rendering the code amount of the compression image data equal to or smaller than the predetermined value.

13. The image compression device according to claim 12 wherein said inverse quantization circuit uses the quantization threshold value referred to at the previous quantization by said quantization circuit as the quantization threshold value at the time of reference of the quantization threshold value stored in said quantization table.

14. The image compression device according to claim 12 wherein said Huffman encoding circuit uses the Huffman code referred to at the previous variable length encoding by said Huffman encoding circuit as the Huffman code at the time of reference of the Huffman code stored in said Huffman table.

15. The image compression device according to claim 12 further comprising a memory storing the compression image data generated by said Huffman encoding circuit, reading out and transferring the stored image data to said Huffman decoding circuit.

16. The image data compression device according to claim 12 further comprising a frame buffer storing image data of said image of one screen, reading out and transferring the stored image data to said discrete cosine transformation circuit.

17. An image data compression device for compressing image data comprising:

a discreet cosine transformation circuit performing a two-dimensional discrete cosine transformation on image data constituting an image of one screen to generate a discrete cosine transformation coefficient;

a quantization circuit quantizing the discrete cosine transformation coefficient supplied from said discrete cosine transformation circuit referring to a quantization threshold value stored in a preset quantization table;

a Huffman encoding circuit performing a variable length encoding on the discrete cosine transformation coefficient quantized in said quantization circuit, referring to a Huffman code stored in a preset Huffman table to generate compression image data;

a code amount counter counting a code amount of the compression image data generated by said Huffman encoding circuit;

a Huffman decoding circuit performing a variable length decoding on the compression image data generated by said Huffman encoding circuit, referring to a Huffman code stored in a preset Huffman table, to generate decompression image data and sending said decompression image data back to said Huffman encoding circuit;

said Huffman encoding circuit performing the variable length encoding on the decompression image data sent back from said Huffman decoding circuit referring to the Huffman code stored in the preset Huffman table; and a control circuit repeating a process by said Huffman encoding circuit and said Huffman decoding circuit while changing a setting of said Huffman code until the code amount of the compression image data counted by said code amount counter becomes equal to or smaller than a predetermined value, to determine an optimal version of said Huffman code for rendering the code amount of the compression image data equal to or smaller than the predetermined value.

18. The image compression device according to claim 17 wherein said Huffman encoding circuit uses the Huffman code referred to at the previous variable length encoding by said Huffman encoding circuit as the Huffman code at the time of reference to the Huffman code stored in said Huffman table.

19. The image compression device according to claim 17 further comprising a memory storing the compression image data generated by said Huffman encoding circuit, reading out and transferring the stored image data to said Huffman decoding circuit.

20. The image compression device according to claim 19 further comprising a frame buffer storing the image data of said image of one screen, reading out and transferring the stored image data to said discrete cosine transformation circuit.

* * * * *

UNITED STATES PATENT AND TRADEMARK OFFICE
CERTIFICATE OF CORRECTION

PATENT NO. : 6,643,402 B1
DATED : November 4, 2003
INVENTOR(S) : Shigeyuki Okada It is certified that error appears in the above-identified patent and that said Letters Patent is hereby corrected as shown below:

<u>Title page,</u>
Item [73], change "[73] Assignee: Sanyo Electric Co., LTD, Osaka (JP)" to be
-- [73] Assignee: Sanyo Electric Co., LTD., Osaka (JP) --

Signed and Sealed this

Twenty-seventh Day of April, 2004

JON W. DUDAS
*Acting Director of the United States Patent and Trademark Office*